(12) United States Patent
Young et al.

(10) Patent No.: US 10,515,466 B2
(45) Date of Patent: Dec. 24, 2019

(54) OPTIMIZED DEFERRED LIGHTING IN A FOVEATED RENDERING SYSTEM

(71) Applicant: Sony Interactive Entertainment Inc., Tokyo (JP)

(72) Inventors: Andrew Young, San Mateo, CA (US); Chris Ho, San Mateo, CA (US); Jeffrey Roger Stafford, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 73 days.

(21) Appl. No.: 15/727,515

(22) Filed: Oct. 6, 2017

(65) Prior Publication Data

US 2018/0357794 A1 Dec. 13, 2018

Related U.S. Application Data

(60) Provisional application No. 62/517,834, filed on Jun. 9, 2017.

(51) Int. Cl.
*G06K 9/00* (2006.01)
*G06T 11/00* (2006.01)
(Continued)

(52) U.S. Cl.
CPC ............ *G06T 11/001* (2013.01); *G06T 1/20* (2013.01); *G06T 3/0012* (2013.01); *G06T 13/80* (2013.01);
(Continued)

(58) Field of Classification Search
None
See application file for complete search history.

(56) References Cited

U.S. PATENT DOCUMENTS

| 8,942,476 B1* | 1/2015 | Rangaswamy | ...... G06K 9/4652 382/167 |
| 2015/0287158 A1* | 10/2015 | Cerny | ...................... G06F 3/013 345/553 |

(Continued)

FOREIGN PATENT DOCUMENTS

CN 101458823 A 6/2009

OTHER PUBLICATIONS

Ribarov, Javor_Annex to Form PCT/ISA/206 Communication Relating to the Results of the Partial International Search, PCT/US2018/036679, dated Sep. 10, 2018, 8 pages.

*Primary Examiner* — Hadi Akhavannik
(74) *Attorney, Agent, or Firm* — Penilla IP, APC

(57) ABSTRACT

A method for implementing a graphics pipeline. The method includes determining a plurality of light sources affecting a virtual scene. Geometries of objects of an image of the scene is projected onto a plurality of pixels of a display from a first point-of-view. The pixels are partitioned into a plurality of tiles. A foveal region of highest resolution is defined for the image as displayed, wherein a first subset of pixels is assigned to the foveal region, and wherein a second subset of pixels is assigned to a peripheral region that is outside of the foveal region. A first set of light sources is determined from the plurality of light sources that affect one or more objects displayed in a first tile that is in the peripheral region. At least two light sources from the first set is clustered into a first aggregated light source affecting the first tile when rendering the image in pixels of the first tile.

21 Claims, 14 Drawing Sheets

(51) Int. Cl.
*G06T 13/80* (2011.01)
*G06T 1/20* (2006.01)
*G06T 3/00* (2006.01)
*G06T 15/50* (2011.01)

(52) U.S. Cl.
CPC .......... *G06T 15/50* (2013.01); *G06T 2210/36* (2013.01); *G06T 2215/12* (2013.01)

(56) References Cited

U.S. PATENT DOCUMENTS

2015/0287167 A1 10/2015 Cerny
2017/0109562 A1* 4/2017 Shroff .................... G06F 1/163

* cited by examiner

US 10,515,466 B2

OPTIMIZED DEFERRED LIGHTING IN A FOVEATED RENDERING SYSTEM

CLAIM OF PRIORITY

The present application claims priority to and the benefit of the commonly owned, provisional patent application, U.S. Ser. No. 62/517,834, filed on Jun. 9, 2017, entitled "OPTIMIZED DEFERRED LIGHTING IN A FOVEATED RENDERING SYSTEM," which is herein incorporated by reference in its entirety.

TECHNICAL FIELD

The present disclosure is related to video games or gaming applications. Among other things, this disclosure describes methods and systems for aggregating light sources in a foveated rendering system.

BACKGROUND OF THE DISCLOSURE

Video gaming has increasingly become more popular with the advancement of video game technology. For example, high powered graphics processors provide an unbelievably viewing and interactive experience when playing a video game. In addition, displays are being designed with higher and higher resolutions. For example, present technology includes displays having 2K resolution (e.g., 2.2 megapixels over 2048×1080 pixels) with an aspect ratio of approximately 19:10. Other displays having 4K UHD (Ultra high definition) resolution (e.g., 8.2 megapixels over 3840×2160 pixels) with an aspect ratio of 16:9 are now pushing into the market and is expected to gain traction. Increased graphics processing capabilities along with high resolution displays provide for a heretofore unbelievable viewing experience for the user, especially when playing a video game and gaming engine designed to take advantage of the higher resolution displays.

Pushing rendered images/frames to a high resolution display also requires increased bandwidth capabilities, such as between the rendering engine and the display. In most cases, a wired connection should be able to handle the required bandwidth supporting the display. However, gaming systems increasingly are configured with a wireless connection that may provide a bottleneck when pushing data to the display. For instance, a wireless connection may be established between a gaming console local to the user and the display. In these cases, the wireless connection may not be robust enough to handle the required bandwidth to fully take advantage of the higher resolution displays, such that the video game as displayed may be interrupted (as the buffer is filling up) in order to display the entire video sequence as rendered. In some cases, the video game processing may be throttled in order to match the lower bandwidth of the wireless connection to the display, such that the video frames may be rendered at lower resolutions in order to push video data over the wireless connection without interruption; however, by throttling the processing, the user is denied the full gaming experience with higher resolution graphics.

It would be beneficial to modify the graphics processing in order for the user to achieve a high level of satisfaction for the user, especially when playing a video game.

It is in this context that embodiments of the disclosure arise.

SUMMARY

Embodiments of the present disclosure relate to foveated rendering configured to display portions of images in a foveal region with high resolution and portions outside the foveal region with lower resolution. In particular, image portions that are outside the foveal region are rendered with aggregated light sources, wherein an aggregated light source closely approximates the total effect produced from each individual light source of a corresponding cluster of light sources. As such, instead of computing the individual effects of each of the individual light sources of a cluster, only the effect of the aggregated light source of the cluster is computed. In that manner, the total bandwidth for the sequence of video frames being displayed is reduced, for example due in part to less complex images. Further, the sequence of video frames can be delivered (e.g., over wired or wireless connections) in real time with minimal or no latency because the computation complexity is reduced.

In one embodiment, a method for implementing a graphics pipeline is disclosed. The method includes determining a plurality of light sources affecting a virtual scene. The method includes projecting geometries of objects of an image of the scene onto a plurality of pixels of a display from a first point-of-view. The method includes partitioning a plurality of pixels of the display into a plurality of tiles. The method includes defining a foveal region of highest resolution for the image as displayed, wherein a first subset of pixels is assigned to the foveal region, and wherein a second subset of pixels is assigned to a peripheral region that is outside of the foveal region. The method includes determining a first set of light sources from the plurality of light sources that affect one or more objects displayed in a first tile that is in the peripheral region. The method includes clustering at least two light sources from the first set into a first aggregated light source affecting the first tile when rendering the image in pixels of the first tile.

In still another embodiment, a computer system is disclosed. The computer system including a processor and memory, wherein the memory is coupled to the processor and having stored therein instructions that, if executed by the computer system, cause the computer system to execute a method for implementing a graphics pipeline. The method includes determining a plurality of light sources affecting a virtual scene. The method includes projecting geometries of objects of an image of the scene onto a plurality of pixels of a display from a first point-of-view. The method includes partitioning a plurality of pixels of the display into a plurality of tiles. The method includes defining a foveal region of highest resolution for the image as displayed, wherein a first subset of pixels is assigned to the foveal region, and wherein a second subset of pixels is assigned to a peripheral region that is outside of the foveal region. The method includes determining a first set of light sources from the plurality of light sources that affect one or more objects displayed in a first tile that is in the peripheral region. The method includes clustering at least two light sources from the first set into a first aggregated light source affecting the first tile when rendering the image in pixels of the first tile.

In another embodiment, a non-transitory computer-readable medium storing a computer program for implementing a graphics pipeline is disclosed. The computer-readable medium includes program instructions for determining a plurality of light sources affecting a virtual scene. The computer-readable medium further includes program instructions for projecting geometries of objects of an image of the scene onto a plurality of pixels of a display from a first point-of-view. The computer-readable medium further includes program instructions for partitioning a plurality of pixels of the display into a plurality of tiles. The computer-readable medium further includes program instructions for defining a foveal region of highest resolution for the image as displayed, wherein a first subset of pixels is assigned to the foveal region, and wherein a second subset of pixels is assigned to a peripheral region that is outside of the foveal region. The computer-readable medium further includes program instructions for determining a first set of light sources from the plurality of light sources that affect one or more objects displayed in a first tile that is in the peripheral region. The computer-readable medium further includes program instructions for clustering at least two light sources from the first set into a first aggregated light source affecting the first tile when rendering the image in pixels of the first tile.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe a graphics processor of a video rendering system that is configured to perform foveated rendering, wherein portions of images in a foveal region may be rendered with high resolution and portions outside the foveal region may be rendered with lower resolution. In particular, image portions that are outside the foveal region are rendered with aggregated light sources in order to reduce the computation for rendering images, wherein an aggregated light source closely approximates the total effect produced from each individual light source of a corresponding cluster of light sources. In some embodiments, the foveated rendering is performed within or for the purposes of displaying images within a head mounted display (HMD).

With the above general understanding of the various embodiments, example details of the embodiments will now be described with reference to the various drawings.

Throughout the specification, the reference to "video game" or "gaming application" is meant to represent any type of interactive application that is directed through execution of input commands. For illustration purposes only, an interactive application includes applications for gaming, word processing, video processing, video game processing, etc. Further, the terms video game and gaming application are interchangeable.

Figure 1A:
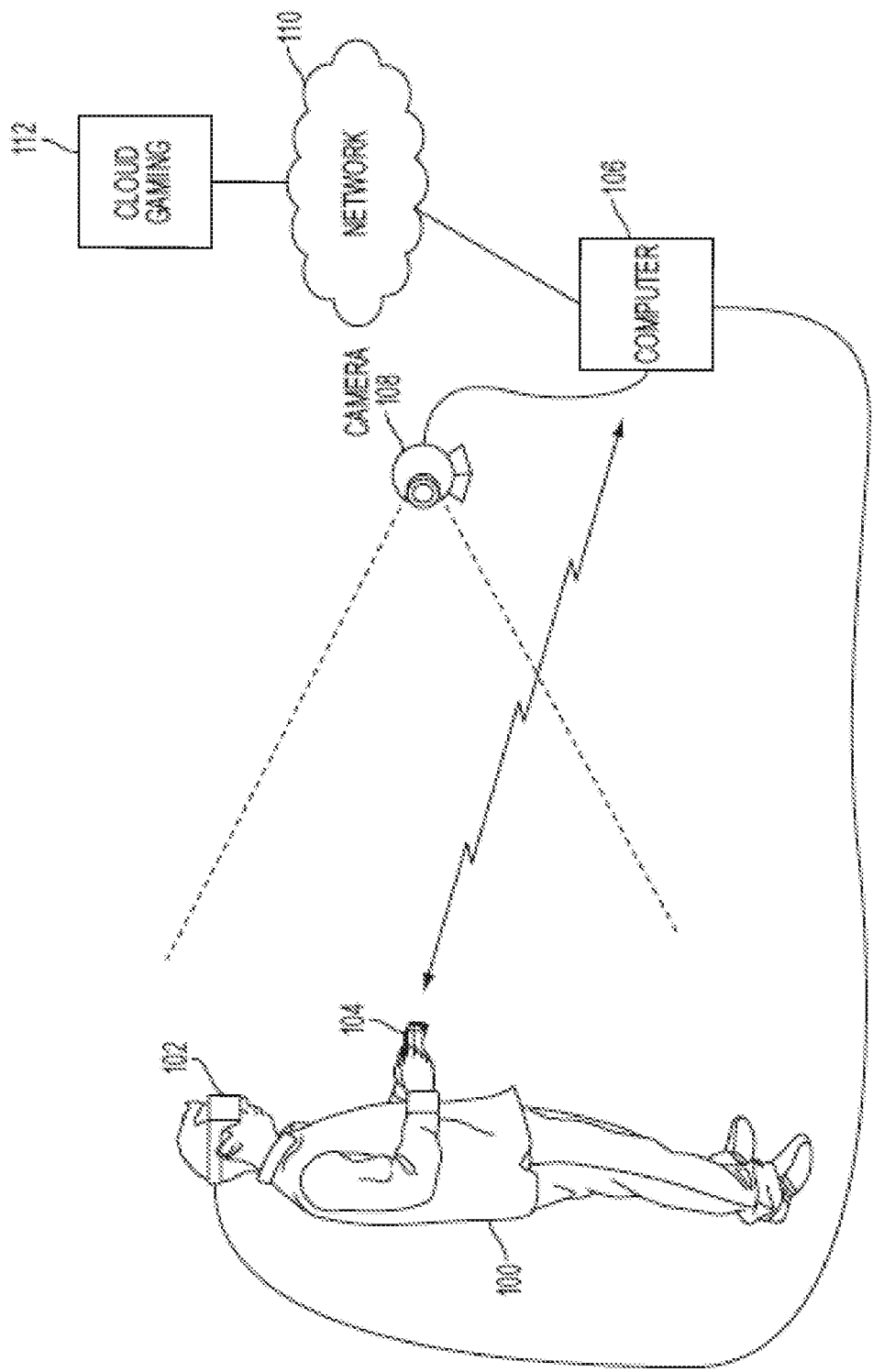
FIG. 1A illustrates a system configured for providing an interactive experience with VR content, in accordance with one embodiment of the present disclosure.

FIG. 1A illustrates a system for interactive gameplay of a video game, in accordance with an embodiment of the invention. A user 100 is shown wearing a head-mounted display (HMD) 102. The HMD 102 is worn in a manner similar to glasses, goggles, or a helmet, and is configured to display a video game from an interactive video game or other content from interactive application, to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user. Though FIGS. 1A-1B and in other figures are shown using HMDs for displaying rendered images, embodiments of the present invention are well suited for performing foveated rendering in any display device, wherein the foveated rendering includes the aggregation of light sources for rendering objects displayed in peripheral regions, and displaying the rendered images on any display.

In one embodiment, HMD 102 is configurable to display images configured with foveated rendering, wherein portions of images in a foveal region are displayed with high resolution and portions outside the foveal region are displayed with lower resolution. In particular, image portions that are outside the foveal region are rendered with aggregated light sources, wherein an aggregated light source closely approximates the total effect produced from each individual light source of a corresponding cluster of light sources. As such, instead of computing the individual effects of each of the individual light sources of a cluster, only the effect of the aggregated light source of the cluster is computed. In that manner, the total bandwidth for the sequence of video frames being displayed is reduced.

In one embodiment, the HMD 102 can be connected to a computer or gaming console 106. The connection to computer 106 can be wired or wireless. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102. The computer 106 is not restricted to executing a video game but may also be configured to execute an interactive application, which outputs VR content 191 for rendering by the HMD 102. In one embodiment, computer 106 performs the aggregating of light sources when rendering portions of images outside of the foveal region.

The user 100 may operate a controller 104 to provide input for the video game. Additionally, a camera 108 can be configured to capture one or more images of the interactive environment in which the user 100 is located. These captured images can be analyzed to determine the location and movements of the user 100, the HMD 102, and the controller 104. In one embodiment, the controller 104 includes a light or other marker elements which can be tracked to determine its location and orientation. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network with a cloud gaming provider 112. The cloud gaming provider 112 maintains and executes the video game being played by the user 102. The computer 106 transmits inputs from the HMD 102, the controller 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas the haptic feedback data is used to generate a vibration feedback command, which is provided to the controller 104.

In one embodiment, the HMD 102, controller 104, and camera 108, may themselves be networked devices that connect to the network 110 to communicate with the cloud gaming provider 112. For example, the computer 106 may be a local network device, such as a router, that does not otherwise perform video game processing, but facilitates passage network traffic. The connections to the network by the HMD 102, controller 104, and camera (i.e., image capture device) 108 may be wired or wireless.

In yet another embodiment, the computer 106 may execute a portion of the video game, while the remaining portion of the video game may be executed on a cloud gaming provider 112. In other embodiments, portions of the video game may also be executed on HMD 102. For example, a request for downloading the video game from the computer 106 may be serviced by the cloud gaming provider 112. While the request is being serviced, the cloud gaming provider 112 may execute a portion of the video game and provide game content to the computer 106 for rendering on the HMD 102. The computer 106 may communicate with the cloud gaming provider 112 over a network 110. Inputs received from the HMD 102, the controller 104 and the camera 108, are transmitted to the cloud gaming provider 112, while the video game is downloading on to the computer 106. The cloud gaming provider 112 processes the inputs to affect the game state of the executing video game. The output from the executing video game, such as video data, audio data, and haptic feedback data, is transmitted to the computer 106 for onward transmission to the respective devices.

Once the video game has been completely downloaded to the computer 106, the computer 106 may execute the video game and resume game play of the video game from where it was left off on the cloud gaming provider 112. The inputs from the HMD 102, the controller 104, and the camera 108 are processed by the computer 106, and the game state of the video game is adjusted, in response to the inputs received from the HMD 102, the controller 104, and the camera 108. In such embodiments, a game state of the video game at the computer 106 is synchronized with the game state at the cloud gaming provider 112. The synchronization may be done periodically to keep the state of the video game current at both the computer 106 and the cloud gaming provider 112. The computer 106 may directly transmit the output data to the relevant devices. For example, video and audio streams are provided to the HMD 102, whereas the haptic feedback data is used to generate a vibration feedback command, which is provided to the controller 104.

Figure 1B:
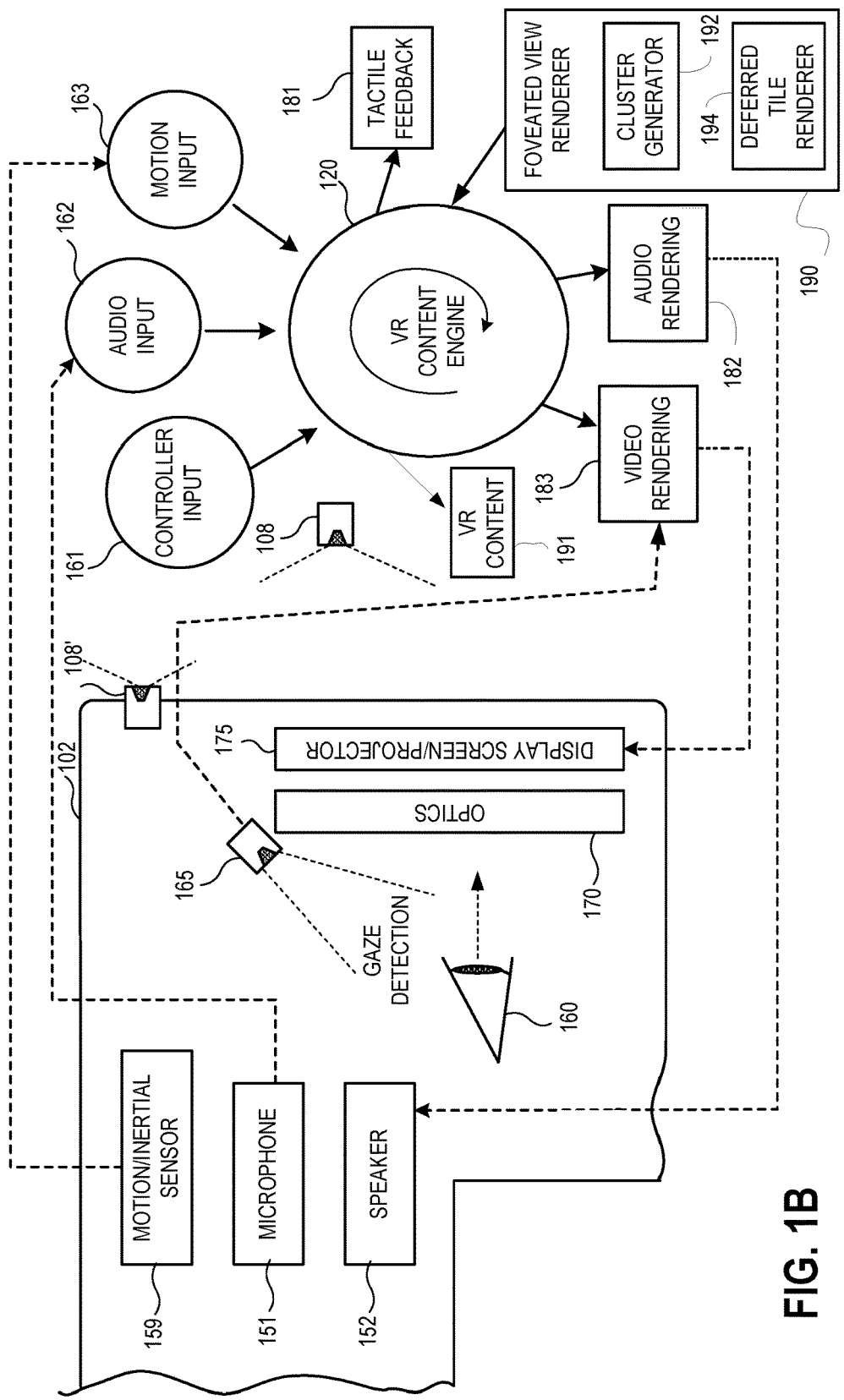
FIG. 1B conceptually illustrates the function of a HMD in conjunction with an executing video game, in accordance with an embodiment of the invention.

FIG. 1B conceptually illustrates the function of a HMD 102 in conjunction with the generation of VR content 191 (e.g., execution of an application and/or video game, etc.), in accordance with an embodiment of the invention. In some implementations, the VR content engine 120 is being executed on a computer 106 (not shown) that is communicatively coupled to the HMD 102. The computer may be local to the HMD (e.g., part of local area network) or may be remotely located (e.g., part of a wide area network, a cloud network, etc.) and accessed via a network. The communication between the HMD 102 and the computer 106 may follow a wired or a wireless connection protocol. For example, the VR content engine 120 executing an application may be a video game engine executing a video game, and is configured to receive inputs to update a game state of the video game. The following description of FIG. 1B is described within the context of the VR content engine 120 executing a video game, for purposes of brevity and clarity, and is intended to represent the execution of any application capable of generating VR content 191. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the game engine 120 receives, by way of example, controller input 161, audio input 162 and motion input 163. The controller input 161 may be defined from the operation of a gaming controller separate from the HMD 102, such as a hand-held gaming controller 104 (e.g. Sony DUALSHOCK®4 wireless controller, Sony PlayStation® Move motion controller) or wearable controllers, such as wearable glove interface controller, etc. By way of example, controller input 161 may include directional inputs, button presses, trigger activation, movements, gestures or other kinds of inputs processed from the operation of a gaming controller. The audio input 162 can be processed from a microphone 151 of the HMD 102, or from a microphone included in the image capture device 108 or elsewhere within the local system environment. The motion input 163 can be processed from a motion sensor 159 included in the HMD 102, or from image capture device 108 as it captures images of the HMD 102. The VR content engine 120 (e.g., executing a gaming application) receives inputs which are processed according to the configuration of the game engine to update the game state of the video game. The engine 120 outputs game state data to various rendering modules which process the game state data to define content which will be presented to the user.

In the illustrated embodiment, a video rendering module 183 is defined to render a video stream for presentation on the HMD 102. Foveated view renderer 190 is configured to render foveated images in conjunction with and/or independent of video rendering module 183. Additionally, the functionality provided by the foveated view renderer 190 may be incorporated within the video rendering module 183, in embodiments. In particular, foveated view renderer 190 is configured to perform foveated rendering, wherein portions of images in a foveal region with high resolution and portions outside the foveal region with lower resolution. In particular, image portions that are outside the foveal region are rendered with aggregated light sources in order to reduce the computation for rendering images, wherein an aggregated light source closely approximates the total effect produced from each individual light source of a corresponding cluster of light sources. Cluster generator 192 is configured to aggregate light sources in a cluster of light sources for purposes of foveated rendering. More particularly, deferred tile renderer 194 is configured to perform deferred tile rendering by rendering objects in individually tiled portions of pixels of the display, wherein for tiles displaying objects located outside of the foveal region light sources are aggregated by the cluster generator 192 when performing foveated rendering.

A lens of optics 170 in the HMD 102 is configured for viewing the VR content 191. A display screen 175 is disposed behind the lens of optics 170, such that the lens of optics 170 is between the display screen 175 and an eye 160 of the user, when the HMD 102 is worn by the user. In that manner, the video stream may be presented by the display screen/projector mechanism 175, and viewed through optics 170 by the eye 160 of the user. An HMD user may elect to interact with the interactive VR content 191 (e.g., VR video source, video game content, etc.) by wearing the HMD and selecting a video game for game play, for example. Interactive virtual reality (VR) scenes from the video game are rendered on the display screen 175 of the HMD. In that manner, the HMD allows the user to completely immerse in the game play by provisioning display mechanism of the HMD in close proximity to the user's eyes. The display regions defined in the display screen of the HMD for rendering content may occupy large portions or even the entirety of the field of view of the user. Typically, each eye is supported by an associated lens of optics 170 which is viewing one or more display screens.

An audio rendering module 182 is configured to render an audio stream for listening by the user. In one embodiment, the audio stream is output through a speaker 152 associated with the HMD 102. It should be appreciated that speaker 152 may take the form of an open air speaker, headphones, or any other kind of speaker capable of presenting audio.

In one embodiment, a gaze tracking camera 165 is included in the HMD 102 to enable tracking of the gaze of the user. Although only one gaze tracking camera 165 is included, it should be noted that more than one gaze tracking camera may be employed to track the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized, such as by providing greater detail, higher resolution through foveated rendering as provided by foveated view renderer 190, or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 165, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 181 is configured to provide signals to tactile feedback hardware included in either the HMD 102 or another device operated by the HMD user, such as a controller 104. The tactile feedback may take the form of various kinds of tactile sensations, such as vibration feedback, temperature feedback, pressure feedback, etc.

Figure 2A:
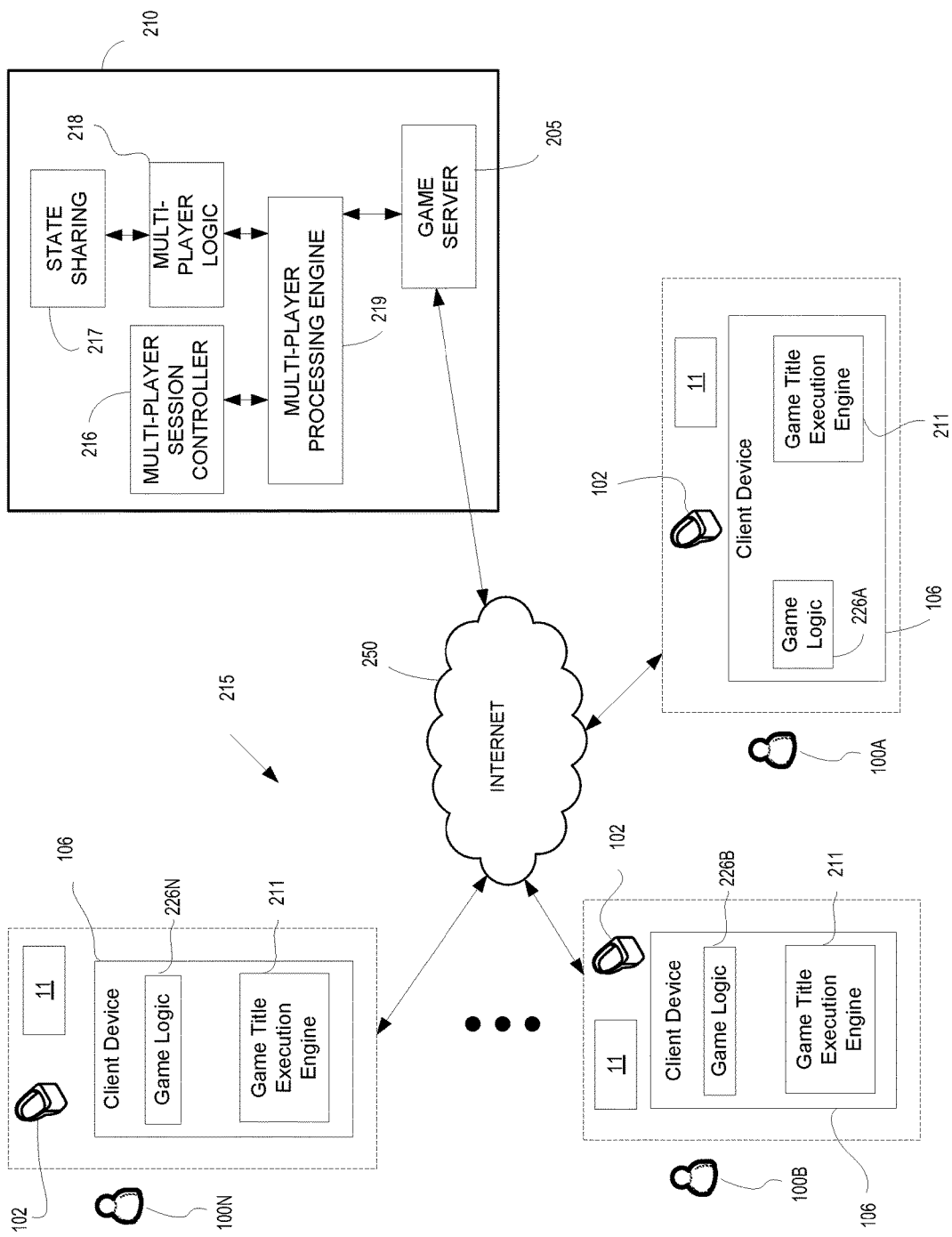
FIG. 2A illustrates a system providing gaming control to one or more users playing one or more gaming applications that are executing locally to the corresponding user, in accordance with one embodiment of the present disclosure.

FIG. 2A illustrates a system 200A providing gaming control to one or more users playing one or more gaming applications that are executing locally to the corresponding user, and wherein back-end server support (e.g., accessible through game server 205) may be configured to support a plurality of local computing devices supporting a plurality of users, wherein each local computing device may be executing an instance of a video game, such as in a single-player or multi-player video game. For example, in a multi-player mode, while the video game is executing locally, the cloud game network concurrently receives information (e.g., game state data) from each local computing device and distributes that information accordingly throughout one or more of the local computing devices so that each user is able to interact with other users (e.g., through corresponding characters in the video game) in the gaming environment of the multi-player video game. In that manner, the cloud game network coordinates and combines the game plays for each of the users within the multi-player gaming environment. Referring now to the drawings, like referenced numerals designate identical or corresponding parts.

As shown in FIG. 2A, a plurality of users 215 (e.g., user 100A, user 100B . . . user 100N) is playing a plurality of gaming applications, wherein each of the gaming applications is executed locally on a corresponding client device 106 (e.g., game console) of a corresponding user. Each of the client devices 106 may be configured similarly in that local execution of a corresponding gaming application is performed. For example, user 100A may be playing a first gaming application on a corresponding client device 106, wherein an instance of the first gaming application is executed by a corresponding game title execution engine 211. Game logic 226A (e.g., executable code) implementing the first gaming application is stored on the corresponding client device 106, and is used to execute the first gaming application. For purposes of illustration, game logic may be delivered to the corresponding client device 106 through a portable medium (e.g., flash drive, compact disk, etc.) or through a network (e.g., downloaded through the internet 250 from a gaming provider). In addition, user 100B is playing a second gaming application on a corresponding client device 106, wherein an instance of the second gaming application is executed by a corresponding game title execution engine 211. The second gaming application may be identical to the first gaming application executing for user 100A or a different gaming application. Game logic 226B (e.g., executable code) implementing the second gaming application is stored on the corresponding client device 106 as previously described, and is used to execute the second gaming application. Further, user 100N is playing an Nth gaming application on a corresponding client device 106, wherein an instance of the Nth gaming application is executed by a corresponding game title execution engine 211. The Nth gaming application may be identical to the first or second gaming application, or may be a completely different gaming application. Game logic 226N (e.g., executable code) implementing the third gaming application is stored on the corresponding client device 106 as previously described, and is used to execute the Nth gaming application.

As previously described, client device 106 may receive input from various types of input devices, such as game controllers, tablet computers, keyboards, gestures captured by video cameras, mice touch pads, etc. Client device 106 can be any type of computing device having at least a memory and a processor module that is capable of connecting to the game server 205 over network 150. Also, client device 106 of a corresponding user is configured for generating rendered images executed by the game title execution engine 211 executing locally or remotely, and for displaying the rendered images on a display (e.g., display 11, HMD 102, etc.). For example, the rendered images may be associated with an instance of the first gaming application executing on client device 106 of user 100A. For example, a corresponding client device 106 is configured to interact with an instance of a corresponding gaming application as executed locally or remotely to implement a game play of a corresponding user, such as through input commands that are used to drive game play. Some examples of client device 106 include a personal computer (PC), a game console, a home theater device, a general purpose computer, mobile computing device, a tablet, a phone, or any other types of computing devices that can interact with the game server 205 to execute an instance of a video game.

In one embodiment, client device 106 is operating in a single-player mode for a corresponding user that is playing a gaming application. In another embodiment, multiple client devices 106 are operating in a multi-player mode for corresponding users that are each playing a specific gaming application. In that case, back-end server support via the game server may provide multi-player functionality, such as through the multi-player processing engine 219. In particular, multi-player processing engine 219 is configured for controlling a multi-player gaming session for a particular gaming application. For example, multi-player processing engine 219 communicates with the multi-player session controller 216, which is configured to establish and maintain communication sessions with each of the users and/or players participating in the multi-player gaming session. In that manner, users in the session can communicate with each other as controlled by the multi-player session controller 216.

Further, multi-player processing engine 219 communicates with multi-player logic 218 in order to enable interaction between users within corresponding gaming environments of each user. In particular, state sharing module 217 is configured to manage states for each of the users in the multi-player gaming session. For example, state data may include game state data that defines the state of the game play (of a gaming application) for a corresponding user at a particular point. For example, game state data may include game characters, game objects, game object attributes, game attributes, game object state, graphic overlays, etc. In that manner, game state data allows for the generation of the gaming environment that exists at the corresponding point in the gaming application. Game state data may also include the state of every device used for rendering the game play, such as states of CPU, GPU, memory, register values, program counter value, programmable DMA state, buffered data for the DMA, audio chip state, CD-ROM state, etc. Game state data may also identify which parts of the executable code need to be loaded to execute the video game from that point. Game state data may be stored in database (not shown), and is accessible by state sharing module 217.

Further, state data may include user saved data that includes information that personalizes the video game for the corresponding player. This includes information associated with the character played by the user, so that the video game is rendered with a character that may be unique to that user (e.g., location, shape, look, clothing, weaponry, etc.). In that manner, the user saved data enables generation of a character for the game play of a corresponding user, wherein the character has a state that corresponds to the point in the gaming application experienced currently by a corresponding user. For example, user saved data may include the game difficulty selected by a corresponding user 100A when playing the game, game level, character attributes, character location, number of lives left, the total possible number of lives available, armor, trophy, time counter values, etc. User saved data may also include user profile data that identifies a corresponding user 100A, for example. User saved data may be stored in storage (not shown).

In that manner, the multi-player processing engine 219 using the state sharing data 217 and multi-player logic 218 is able to overlay/insert objects and characters into each of the gaming environments of the users participating in the multi-player gaming session. For example, a character of a first user is overlaid/inserted into the gaming environment of a second user. This allows for interaction between users in the multi-player gaming session via each of their respective gaming environments (e.g., as displayed on a screen).

Figure 2B:
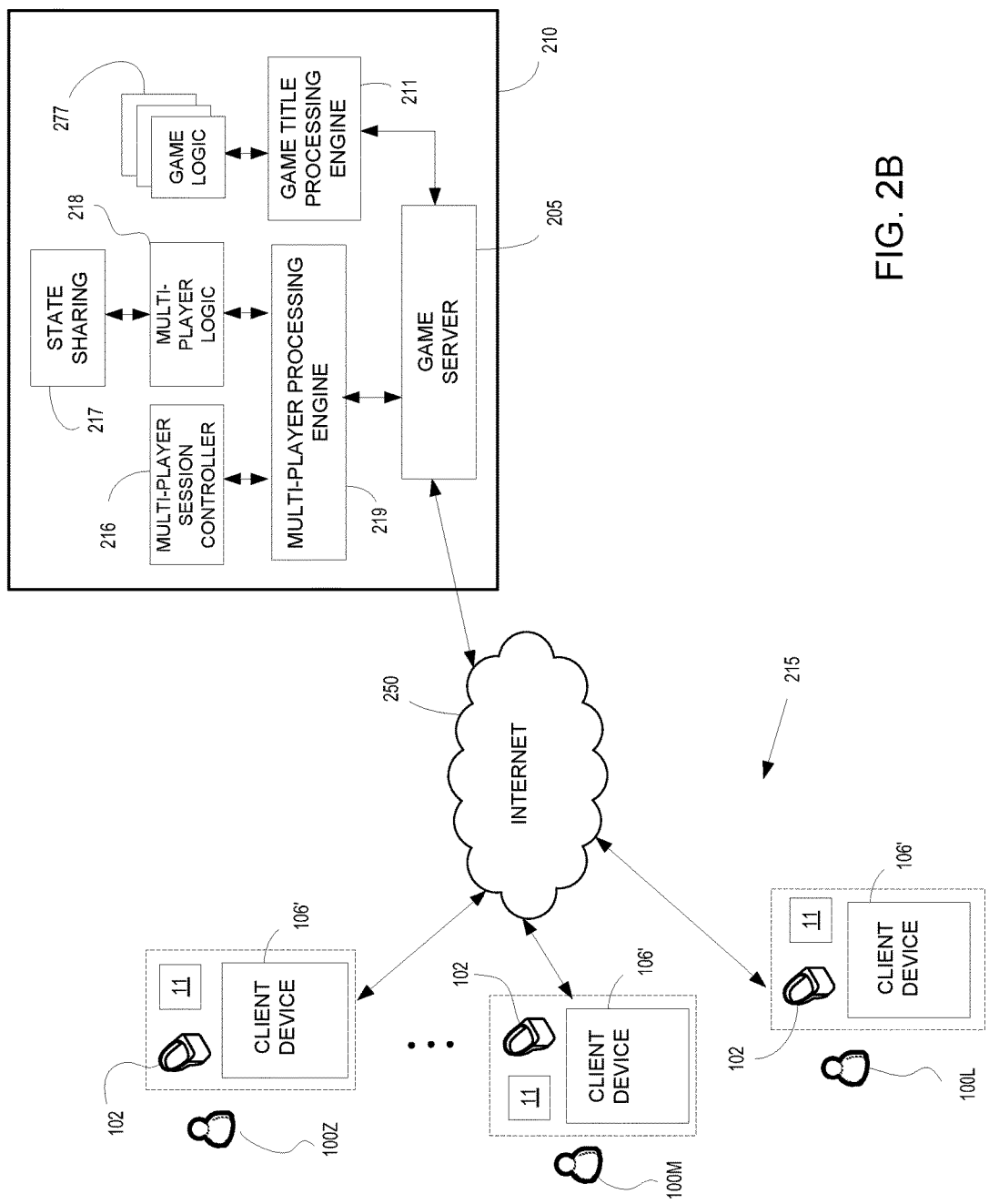
FIG. 2B illustrates a system providing gaming control to one or more users playing a gaming application as executed over a cloud game network, in accordance with one embodiment of the present disclosure.

FIG. 2B illustrates a system 200B providing gaming control to one or more users 215 (e.g., users 100L, 100M . . . 100Z) playing a gaming application in respective VR viewing environments as executed over a cloud game network, in accordance with one embodiment of the present disclosure. In some embodiments, the cloud game network may be a game cloud system 210 that includes a plurality of virtual machines (VMs) running on a hypervisor of a host machine, with one or more virtual machines configured to execute a game processor module utilizing the hardware resources available to the hypervisor of the host. Referring now to the drawings, like referenced numerals designate identical or corresponding parts.

As shown, the game cloud system 210 includes a game server 205 that provides access to a plurality of interactive video games or gaming applications. Game server 205 may be any type of server computing device available in the cloud, and may be configured as one or more virtual machines executing on one or more hosts. For example, game server 205 may manage a virtual machine supporting a game processor that instantiates an instance of a gaming application for a user. As such, a plurality of game processors of game server 205 associated with a plurality of virtual machines is configured to execute multiple instances of the gaming application associated with game plays of the plurality of users 215. In that manner, back-end server support provides streaming of media (e.g., video, audio, etc.) of game plays of a plurality of gaming applications to a plurality of corresponding users.

A plurality of users 215 accesses the game cloud system 210 via network 250, wherein users (e.g., users 100L, 100M . . . 100Z) access network 250 via corresponding client devices 106', wherein client device 106' may be configured similarly as client device 106 of FIG. 2A (e.g., including game executing engine 211, etc.), or may be configured as a thin client providing that interfaces with a back end server providing computational functionality (e.g., including game executing engine 211).

In particular, a client device 106' of a corresponding user 100L is configured for requesting access to gaming applications over a network 250, such as the internet, and for rendering instances of gaming application (e.g., video game) executed by the game server 205 and delivered to a display device associated with the corresponding user 100L. For example, user 100L may be interacting through client device 106' with an instance of a gaming application executing on game processor of game server 205. More particularly, an instance of the gaming application is executed by the game title execution engine 211. Game logic (e.g., executable code) implementing the gaming application is stored and accessible through a data store (not shown), and is used to execute the gaming application. Game title processing engine 211 is able to support a plurality of gaming applications using a plurality of game logics 277, as shown.

As previously described, client device 106' may receive input from various types of input devices, such as game controllers, tablet computers, keyboards, gestures captured by video cameras, mice touch pads, etc. Client device 106' can be any type of computing device having at least a memory and a processor module that is capable of connecting to the game server 205 over network 250. Also, client device 106' of a corresponding user is configured for generating rendered images executed by the game title execution engine 211 executing locally or remotely, and for displaying the rendered images on a display. For example, the rendered images may be associated with an instance of the first gaming application executing on client device 106' of user 100L. For example, a corresponding client device 106' is configured to interact with an instance of a corresponding gaming application as executed locally or remotely to implement a game play of a corresponding user, such as through input commands that are used to drive game play.

Client device 106' is configured for receiving rendered images, and for displaying the rendered images on display 11 and/or HMD 102 (e.g., displaying VR content). For example, through cloud based services the rendered images may be delivered by an instance of a gaming application executing on game executing engine 211 of game server 205 in association with user 100. In another example, through local game processing, the rendered images may be delivered by the local game executing engine 211. In either case, client device 106 is configured to interact with the local or remote executing engine 211 in association with the game play of a corresponding user 100, such as through input commands that are used to drive game play. In another implementation, the rendered images may be streamed to a smartphone or tablet, wirelessly or wired, direct from the cloud based services or via the client device 106 (e.g., PlayStation® Remote Play).

In another embodiment, multi-player processing engine 219, previously described, provides for controlling a multi-player gaming session for a gaming application. In particular, when the multi-player processing engine 219 is managing the multi-player gaming session, the multi-player session controller 216 is configured to establish and maintain communication sessions with each of the users and/or players in the multi-player session. In that manner, users in the session can communicate with each other as controlled by the multi-player session controller 216.

Further, multi-player processing engine 219 communicates with multi-player logic 218 in order to enable interaction between users within corresponding gaming environments of each user. In particular, state sharing module 217 is configured to manage states for each of the users in the multi-player gaming session. For example, state data may include game state data that defines the state of the game play (of a gaming application) for a corresponding user 100 at a particular point, as previously described. Further, state data may include user saved data that includes information that personalizes the video game for the corresponding player, as previously described. For example, state data includes information associated with the user's character, so that the video game is rendered with a character that may be unique to that user (e.g., shape, look, clothing, weaponry, etc.). In that manner, the multi-player processing engine 219 using the state sharing data 217 and multi-player logic 218 is able to overlay/insert objects and characters into each of the gaming environments of the users participating in the multi-player gaming session. This allows for interaction between users in the multi-player gaming session via each of their respective gaming environments (e.g., as displayed on a screen).

Figure 3A:
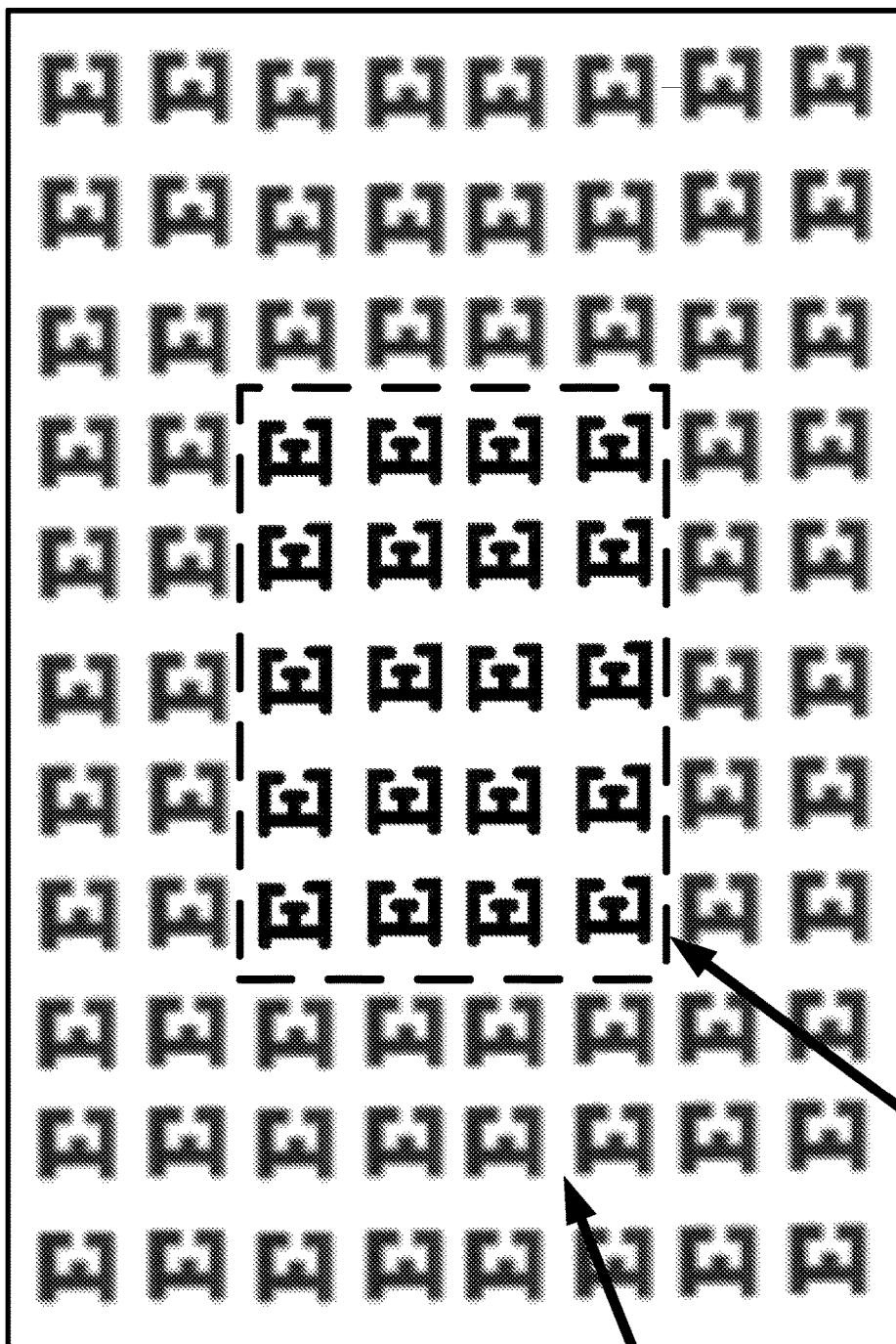
FIG. 3A illustrates an image shown on a display and including a foveal region of high resolution, wherein the foveal region corresponds to a center of the display, in accordance with one embodiment of the present disclosure.

FIG. 3A illustrates an image 310 shown on a display 300, wherein the image includes a foveal region 310A of high resolution, wherein the foveal region corresponds to a center of the display, in accordance with one embodiment of the present disclosure. In particular, image 310 includes rows and columns of the letter "E" for simplicity and clarity. The image 310 is partitioned into multiple regions, including a foveal region 310A and a peripheral region 310B.

As shown, the foveal region 310A is static and corresponds to the center of the display 300. The foveal region 310A is assumed to be the region towards which the user mostly directs his or her gaze (e.g., using the fovea of the eye), such as when viewing graphics of a video game. Though the gaze of the user may occasionally be directed off center, the gaze is mostly directed to the center (to view the main content). In some cases, the image is designed to initially bring the gaze of the user off-center (e.g., to view an object of interest), but then to bring the gaze back to the center (e.g., by moving the object towards the foveal region 310A).

In particular, the portion or portions of any image, such as image 310, as displayed and located within the foveal region 310A will be rendered at higher resolution. For example, the graphics pipeline will render portions of the image in the foveal region 310A while minimizing the use of any techniques used to reduce computational complexity. In particular, for embodiments of the present invention, light sources affecting objects displayed using pixels corresponding to the foveal region 310A are individually computed within the graphics pipeline in order to determine each of their effects on the objects (e.g., color, texture, shadowing, etc. on polygons of the objects). Representative of the higher resolution, the letter "E" objects as displayed within the foveal region 310A are shown with clarity, vibrant color, and minimal blurriness. This is consistent with and takes advantage of the gaze of the user being directed towards the foveal region 310A on display 300.

In addition, the portion or portions of an image, such as image 310, as disposed and located in the peripheral region 310B will be rendered at lower resolution (e.g., lower than the resolution of the portions of the image and/or objects located in the foveal region 310A). The gaze of the user is not typically directed to the objects located in and/or displayed in the peripheral region 310B, as the main focus of the gaze is directed to the objects in the foveal region 310A. Consistent with real-life views into a scene, the objects in the peripheral region 310B are rendered with lower resolution, with enough detail so that the user is able to perceive moving objects (e.g., a human walking straight-legged instead of with knees bent) and with sufficient contrast within an object or between objects in the peripheral region 310B, for example. To achieve rendering at lower resolutions, the graphics pipeline may render portions of the image in the peripheral region 310B using computationally efficient techniques that reduce computational complexity. In particular, for embodiments of the present invention, light sources affecting objects displayed using pixels corresponding to pixels in the peripheral region 310B may be grouped into one or more clusters, and wherein light sources in a cluster are aggregated into a single light source that closely approximates the total effect produced from each individual light source of the corresponding cluster of light sources. As such, instead of computing the individual effects of each of the individual light sources of a cluster, only the effect of the aggregated light source of the cluster is computed. This reduces computational processing when rendering the overall image, and especially for objects rendered in the peripheral region 310B.

Figure 3B:
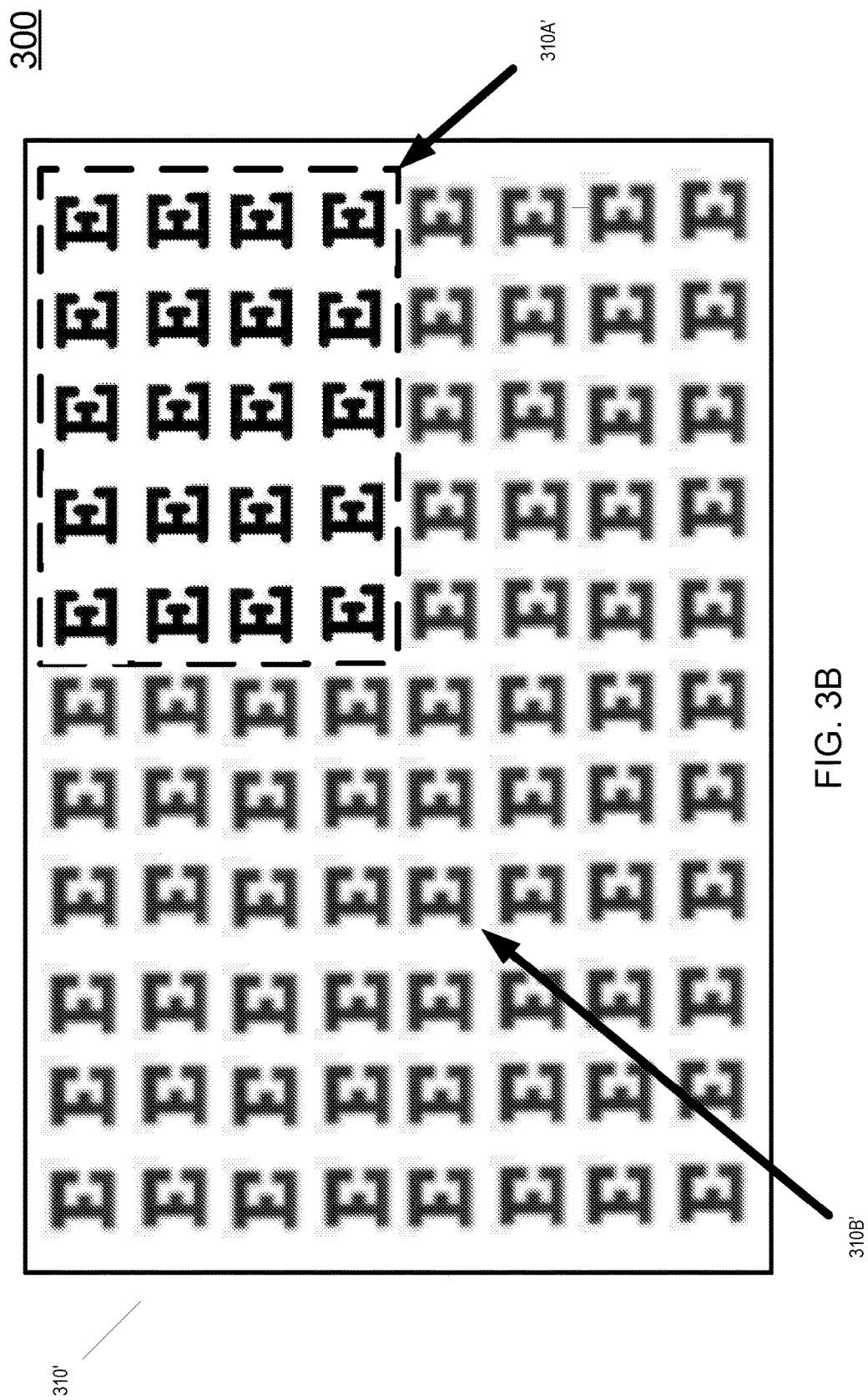
FIG. 3B illustrates an image shown on a display and including a foveal region of high resolution, wherein the foveal region corresponds to a location of the display towards which the user is directing his or her gaze, in accordance with one embodiment of the present disclosure.

FIG. 3B illustrates an image 310' shown on a display 300 and including a foveal region 310A' of high resolution, wherein the foveal region corresponds to a location of the display towards which the user is directing his or her gaze, in accordance with one embodiment of the present disclosure. In particular, image 310' is similar to image 310 shown in FIG. 3A and includes rows and columns of the letter "E" for simplicity and clarity. The image 310 is partitioned into multiple regions, including a foveal region 310A' and a peripheral region 310B'.

As shown, the foveal region 310A' is dynamically moving throughout display 300 depending on which direction the gaze of the user is directed towards. As previously described, the gaze may be tracked using gaze tracking camera 165 of HMD 102, for example. As such, the foveal region 310A' may not necessarily correspond to the center of display 300, but instead correlates to the actual direction and focus of attention of the user within image 310'. That is, the foveal region 310A' dynamically moves with the movement of the eye and/or eyes of the user.

As previously introduced, the portion or portions of any image, such as image 310', as displayed and located within the foveal region 310A' will be rendered at higher resolution by minimizing the use of any rendering techniques used to reduce computational complexity when rendering objects located in the foveal region 310A'. In particular, for embodiments of the present invention, light sources affecting objects displayed using pixels corresponding to the foveal region 310A' are individually computed within the graphics pipeline in order to determine each of their effects on the objects (e.g., color, texture, shadowing, etc. on polygons of the objects). Representative of the higher resolution, the letter "E" objects as displayed within the foveal region 310A' are shown with clarity, vibrant color, and minimal blurriness.

In addition, the portion or portions of an image, such as image 310', as disposed and located in the peripheral region 310B' will be rendered at lower resolution (e.g., lower than the resolution of the portions of the image and/or objects located in the foveal region 310A). As previously introduced, the gaze of the user is not typically directed to the objects located in and/or displayed in the peripheral region 310B', as the main focus of the gaze is directed to the objects in the foveal region 310A'. As such, the objects in the peripheral region 310B' are rendered with lower resolution, with enough detail so that the user is able to perceive moving objects (e.g., a human walking straight-legged instead of with knees bent) and with sufficient contrast within an object or between objects in the peripheral region 310B', for example. To achieve rendering at lower resolutions, the graphics pipeline may render portions of the image in the peripheral region 310B' using computationally efficient techniques that reduce computational complexity. In particular, for embodiments of the present invention, light sources affecting objects displayed using pixels corresponding to pixels in the peripheral region 310B' may be grouped into one or more clusters, and wherein light sources in a cluster are aggregated into a single light source that closely approximates the total effect produced from each individual light source of the corresponding cluster of light sources to reduce computational processing when rendering the overall image, and especially for objects in the peripheral region 310B'.

Figure 4A:
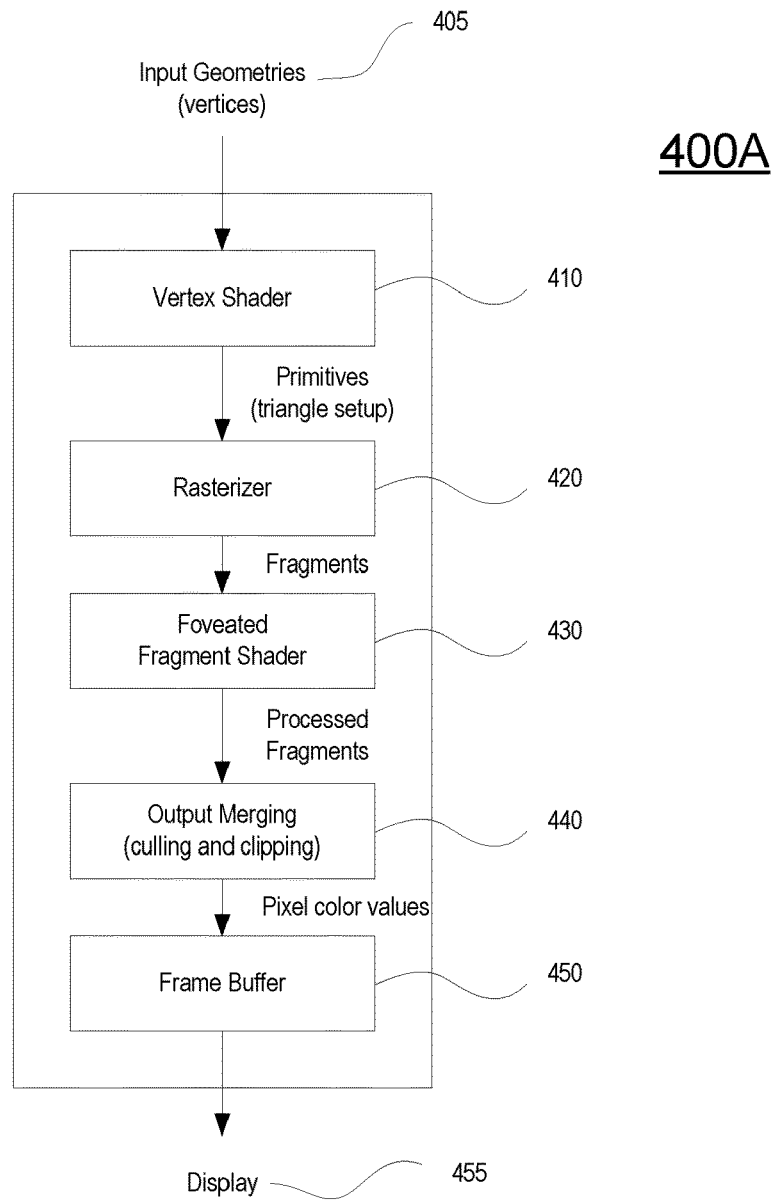
FIG. 4A illustrates a graphics processor implementing a graphics pipeline configured for foveated rendering, in accordance with one embodiment of the present disclosure.

FIG. 4A illustrates a graphics processor implementing a graphics pipeline 400A configured for foveated rendering, in accordance with one embodiment of the present disclosure. The graphics pipeline 400A is illustrative of the general process for rendering images using 3D (three dimensional) polygon rendering processes, but includes an additional programmable element within the pipeline that performs foveated rendering. The graphics pipeline 400A for a rendered image outputs corresponding color information for each of the pixels in a display, wherein the color information may represent texture and shading (e.g., color, shadowing, etc.). Graphics pipeline 400A is implementable within the game console 106 of FIG. 1A, VR content engine 120 of FIG. 1B, client devices 106 of FIGS. 2A and 2B, and/or game title processing engine 211 of FIG. 2B.

As shown, the graphics pipeline receives input geometries 405. For example, the input geometries 405 may include vertices within a 3D gaming world, and information corresponding to each of the vertices. A given object within the gaming world can be represented using polygons (e.g., triangles) defined by vertices, wherein the surface of a corresponding polygon is then processed through the graphics pipeline 400A to achieve a final effect (e.g., color, texture, etc.). Vertex attributes may include normal (e.g., which direction is the light in relation to the vertex), color (e.g., RGB—red, green, and blue triple, etc.), and texture coordinate/mapping information.

The vertex shader and/or program 410 receives the input geometries 405, and builds the polygons or primitives that make up the objects within the 3D scene. That is, the vertex shader 410 builds up the objects using the primitives as they are placed within the gaming world. The vertex shader 410 may be configured to perform lighting and shadowing calculations for the polygons, which is dependent on the lighting for the scene. The primitives are output by the vertex shader 410 and delivered to the next stage of the graphics pipeline 400A. Additional operations may also be performed by the vertex shader 410 such as clipping (e.g., identify and disregard primitives that are outside the viewing frustum as defined by the viewing location in the gaming world).

The primitives are fed into the rasterizer 420 that is configured to project objects in the scene to a two-dimensional (2D) image plane defined by the viewing location in the 3D gaming world (e.g., camera location, user eye location, etc.). At a simplistic level, the rasterizer 420 looks at each primitive and determines which pixels are affected by the corresponding primitive. In particular, the rasterizer 420 partitions the primitives into pixel sized fragments, wherein each fragment corresponds to a pixel in the display. It is important to note that one or more fragments may contribute to the color of a corresponding pixel when displaying an image. Additional operations may also be performed by the rasterizer 420 such as clipping (identify and disregard fragments that are outside the viewing frustum) and culling (disregard fragments that are occluded by closer objects) to the viewing location.

The foveated fragment shader and/or program 430 at its core performs shading operations on the fragments to determine how the color and brightness of a primitive varies with available lighting. For example, fragment shader 430 may determine depth, color, normal and texture coordinates (e.g., texture details) for each fragment, and may further determine appropriate levels of light, darkness, and color for the fragments. In particular, fragment shader 430 calculates the traits of each fragment, including color and other attributes (e.g., z-depth for distance from the viewing location, and alpha values for transparency). In addition, the fragment shader 430 applies lighting effects to the fragments based on the available lighting affecting the corresponding fragments. Further, the fragment shader 430 may apply shadowing effects for each fragment. For purposes of description only light sources are described as being point lights having a definite position in the gaming world, and which radiates light omni-directionally. Other lighting is available, such as directional lighting, etc.

More particularly, the foveated fragment shader 430 performs shading operations as described above based on whether the fragment is within the foveal region or peripheral region. Fragments that are located within the foveal region of the displayed image are processed using shading operations at high resolution, without regard to processing efficiency in order to achieve detailed texture and color values for fragments within the foveal region. On the other hand, the foveated fragment shader 430 performs shading operations on fragments that are located within the peripheral region with an interest in processing efficiency in order to process fragments with sufficient detail with minimal operations, such as providing movement and sufficient contrast. For example, in embodiments of the present invention light sources affecting fragments displayed in pixels in the peripheral region may be grouped into one or more clusters, and wherein light sources in a cluster are aggregated into a single light source that closely approximates the total effect produced from each individual light source of the corresponding cluster of light sources to reduce computational processing when rendering the overall image. The output of the fragment shader 430 includes processed fragments (e.g., texture and shading information) and is delivered to the next stage of the graphics pipeline 400A.

The output merging component 440 calculates the traits of each pixel depending on the fragments that contribute and/or affect each corresponding pixel. That is, the fragments of all primitives in the 3D gaming world are combined into the 2D color pixel for the display. For example, fragments that contribute to texture and shading information for a corresponding pixel are combined to output a final color value for the pixel delivered to the next stage in the graphics pipeline 400A. The output merging component 440 may perform optional blending of values between fragments and/or pixels determined from the fragment shader 430.

Color values for each pixel in the display are stored in the frame buffer 455. These values are scanned to the corresponding pixels when displaying a corresponding image of the scene. In particular, the display reads color values from the frame buffer for each pixel, row-by-row, from left-to-right or right-to-left, top-to-bottom or bottom-to-top, or any other pattern, and illuminates pixels using those pixel values when displaying the image.

Figure 4B:
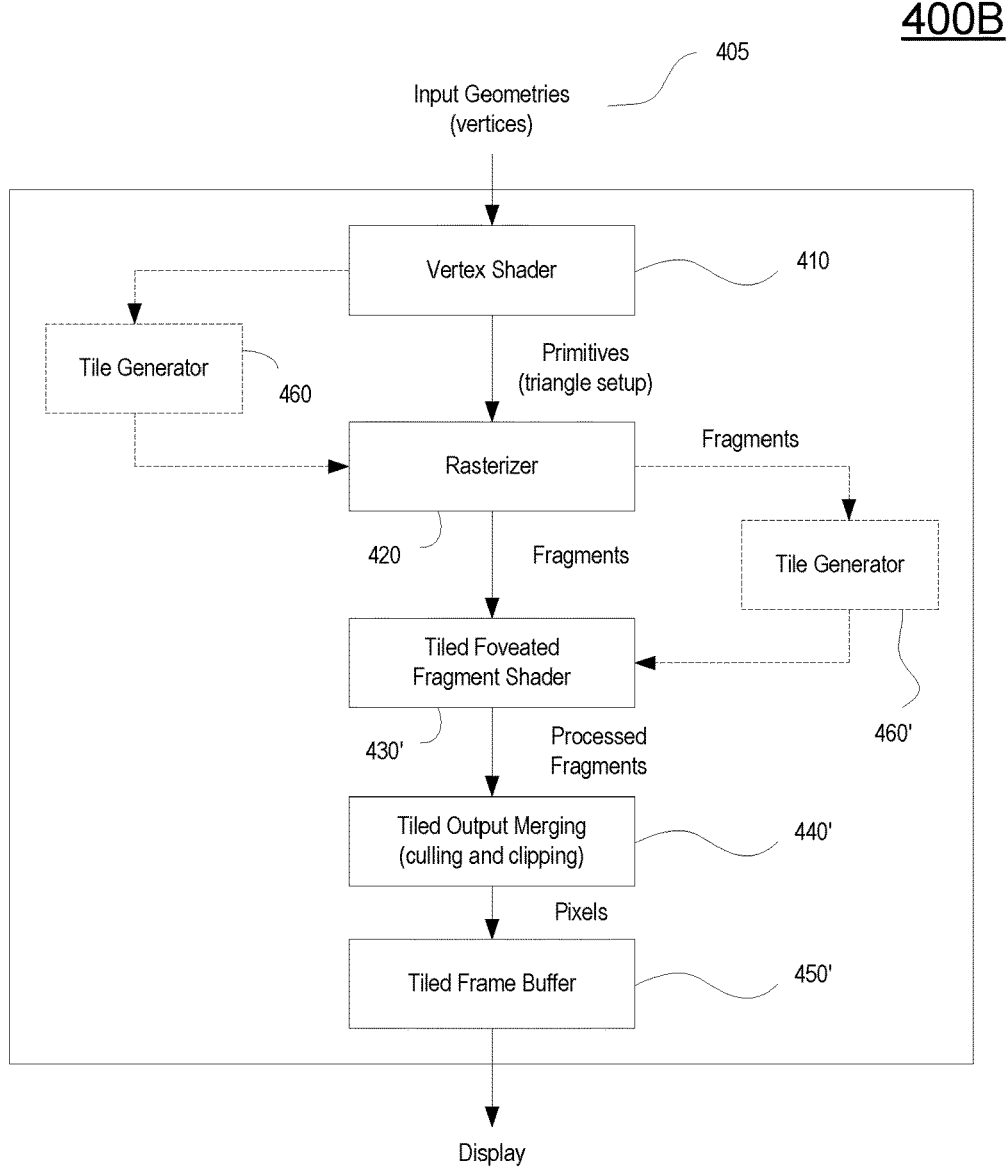
FIG. 4B illustrates a graphics processor implementing a graphics pipeline configured for foveated rendering as implemented through deferred tile rendering, in accordance with one embodiment of the present disclosure.

FIG. 4B illustrates a graphics processor implementing a graphics pipeline configured for foveated rendering as implemented through deferred tile rendering, in accordance with one embodiment of the present disclosure. The graphics pipeline 400B for a rendered image outputs corresponding color information for each of the pixels in a display, wherein the color information may represent texture and shading (e.g., color, shadowing, etc.). Graphics pipeline 400B is implementable within the game console 106 of FIG. 1A, VR content engine 120 of FIG. 1B, client devices 106 of FIGS. 2A and 2B, and/or game title processing engine 211 of FIG. 2B.

Deferred rendering may be performed in any number of ways, and is described generally as implemented through graphics pipeline 400B. In general, deferred tile rendering processes each image of a scene of a gaming world as multiple sub-images. Each sub-image that is generated corresponds to a tile of the display, wherein the display is partitioned into multiple tiles. That is, each tile is rendered separately and the image is fully rendered when all sub-images associated with the various tiles have been rendered.

Associating objects with particular tiles may be performed at one or more stages of the graphics pipeline 400B. As shown, in one embodiment tile generator 460 may perform tiling of the image between the vertex shader 410 and the rasterizer 420. In another embodiment tile generator 460' may perform tiling of the image between the rasterizer 420 and the fragment shader 430'.

Pipeline 400B is similar to pipeline 400A, wherein like referenced numerals designate identical or corresponding parts, and is used to render images using a 3D polygon rendering processes, and includes additional programmable elements that perform foveated rendering. In particular, pipeline 400B is configured to perform tiled rendering, also known as deferred tile rendering, when rendering images. Each of the tiles render their portion of the image with foveated rendering processes, including rendering image portions that are outside a foveal region with lower resolution. For example, image portions in the peripheral region are rendered using an aggregated light source that closely approximates the total effect produced from individual light sources of a corresponding cluster of light sources.

As previously introduced, graphics pipeline 400B receives input geometries 405 that may include vertices within a gaming world, and information corresponding to each of the vertices. Vertex attributes may include normal, color, and texture coordinate/mapping information. The vertices define objects within the gaming world, and more particularly define polygons (e.g., triangles) that form the surfaces of objects within the gaming world. The polygon is processed through graphics pipeline 400B to achieve a final effect (e.g., color, texture, etc.).

The vertex shader 410 receives the input geometries 405 and builds the polygons or primitives that make up the objects within the 3D gaming world. The primitives are output by the vertex shader and delivered to the next stage of the graphics pipeline. Additional operations may be performed by the vertex shader, such as lighting and shadowing calculations, clipping, and/or culling.

In one embodiment, the tile generator 460 is configured to determine where a primitive is ultimately displayed on a tile of a display. The display is partitioned into a plurality of tiles, each tile being associated with a corresponding number of unique pixels. In particular, the tile generator 460 is configured to sort the primitives to determine which primitives overlap or are associated with a corresponding tile. Once the primitives are sorted, the primitives can be processed on a tile-by-tile basis through the graphics pipeline 400B.

The primitives are then fed into the rasterizer 420 that is configured to project objects in the scene to a 2D image plane defined by a viewing location in the gaming world. If the primitives have been sorted by tile, then the rasterizer 420 is projecting objects onto a tile of the 2D image plane. As previously introduced, the rasterizer 420 partitions the primitives into pixel sized fragments, wherein each fragment corresponds to a pixel in the display, and wherein one or more fragments contribute to the color of the pixel. Additional operations may also be performed by the rasterizer 420 such as clipping and culling.

In another embodiment, the tile generator 460' is configured to determine where a fragment is ultimately displayed on a tile of a display based on the information determined by the rasterizer 420. As such, the tile generator 460' is configured to sort the fragments to determine which fragments overlap or are associated with a corresponding tile. Once the fragments are sorted, the fragments can be processed on a tile-by-tile basis through the graphics pipeline 400B.

The tiled foveated fragment shader 430' at its core performs shading operations on the fragments on a tile-by-tile basis to determine how the color and brightness of a primitive varies with available lighting. For example, fragment shader 430' may determine depth, color, normal and texture coordinates (e.g., texture details) for each fragment of a corresponding tile, and may further determine appropriate levels of light, darkness, and color for the fragments. In particular, fragment shader 430' calculates the traits of each fragment, including color and other attributes (e.g., z-depth for distance from the viewing location, and alpha values for transparency). In addition, the fragment shader 430' applies lighting effects to the fragments based on the available lighting affecting the corresponding fragments. Further, the fragment shader 430' may apply shadowing effects for each fragment. For purposes of description only light sources are described as being point lights having a definite position in the gaming world, and which radiates light omni-directionally. Other lighting is available, such as directional lighting, etc.

More particularly, the foveated fragment shader 430' performs shading operations as described above based on whether the fragment is within the foveal region or peripheral region. This may be determined initially by determining whether the tile associated with the fragment is within the foveal region nor peripheral region. Fragments that are located within the foveal region of the displayed image are processed using shading operations at high resolution. On the other hand, the foveated fragment shader 430' performs shading operations on fragments that are located within the peripheral region with an interest in processing efficiency in order to process fragments with sufficient detail with minimal operations, such as providing movement and sufficient contrast. For example, in embodiments of the present invention light sources affecting fragments of a particular tile that is located in the peripheral region may be grouped into one or more clusters, and wherein light sources in a cluster are aggregated into a single light source that closely approximates the total effect produced from each individual light source of the corresponding cluster of light sources to reduce computational processing when rendering the overall image. The output of the fragment shader 430' includes processed fragments (e.g., texture and shading information) and is delivered to the next stage of the graphics pipeline 400B.

The tiled output merging component 440' calculates the traits of each pixel depending on the fragments that contribute and/or affect each corresponding pixel of a corresponding tile that is being processed. That is, the fragments of all primitives in the 3D gaming world are combined into the 2D color pixel of a tile for the display. For example, fragments that contribute to texture and shading information for a corresponding pixel are combined to output a final color value for the pixel delivered to the next stage in the graphics pipeline 400B. The output merging component 440' may perform optional blending of values between fragments and/or pixels determined from the fragment shader 430'.

Color values for each pixel in a tile of a display are stored in the tiled frame buffer 450'. These values are scanned to the corresponding pixels when displaying a corresponding sub-image corresponding to a tile of the scene. In one implementation, the frame buffer 450' fills with information from all the tiles before drawing the image on the display. In particular, the display reads color values from the frame buffer for each pixel, row-by-row, from least-to-right, top-to-bottom, and illuminates pixels using those pixel values when displaying the image.

Figure 5A:
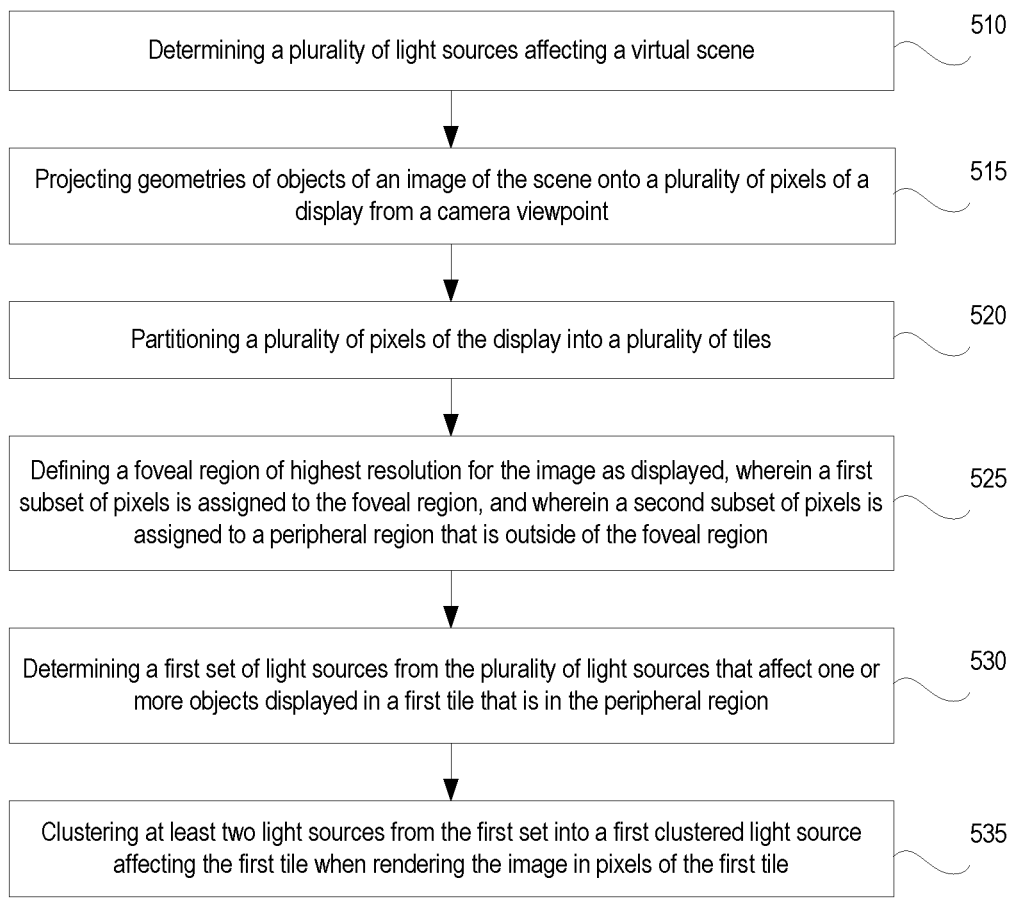
FIG. 5A is a flow diagram illustrating steps in a method for implementing a graphics pipeline configured for foveated rendering, wherein portions of an image in a foveal region are rendered with higher resolution, and portions of an image in a peripheral region are rendered with lower resolution, in accordance with one embodiment of the disclosure.

With the detailed description of the various modules of the gaming server and client device communicating over a network, flow diagram 500A of FIG. 5A discloses a method for implementing a graphics pipeline configured to perform foveated rendering, wherein image portions that are outside of a foveal region are rendered with one or more aggregated light sources, in accordance with one embodiment of the present disclosure. Flow diagram 500A is implemented within a client device or cloud based gaming system when rendering images, as previously described. In one implementation, the client device is a gaming console (also referred to as game console).

At 510, the method includes determining a plurality of light sources affecting a virtual scene. The light sources affect objects within the scene, as processed by the graphics processor. The lighting from the light sources will determine the final color of corresponding pixels when displaying a corresponding object within the scene as viewed from a viewing location.

At 515, the method includes projecting geometries of objects of an image of the scene onto a plurality of pixels of a display from a first point-of-view. As previously introduced, the rasterizer and/or vertex shader are configured to associate primitives and/or fragments of primitives with corresponding pixels. Specifically, the vertex shader may be configured to associate primitives with corresponding pixels, wherein before rasterization the scene by primitives is partitioned into tiles. In addition, the rasterizer may be configured to associate fragments of primitives with corresponding pixels, wherein the scene by fragments may be partitioned into tiles.

At 520, the method includes partitioning a plurality of pixels of the display into a plurality of tiles. In that manner, the graphics processor is able to perform tile rendering or deferred tile rendering when processing the image. Further, a list of primitives that visibly overlap a corresponding tile from the viewing location may be created for each tile. In addition, a list of fragments that visibly overlap a corresponding tile from the viewing location may be created for each tile. In that manner, tile-by-tile rendering can be performed.

At 525, the method includes defining a foveal region of highest resolution for the image as displayed. That is, the image is partitioned into regions where the attention of the user is focused, either by assumption (e.g., generally at the center of the display to cover a static area of the display) or by eye tracking (e.g., to determine the direction of the gaze). The region where the attention of the user is focused is the foveal region, and the portion of the image (e.g., primitives and/or fragments) in the foveal region is rendered by the graphics processor at high resolution. On the other hand, the peripheral region does not have the attention of the user and the portion of the image (e.g., primitives and/or fragments) in the peripheral region is rendered by the graphics processor at a lower resolution. More particularly, a first subset of pixels is assigned to the foveal region, and wherein primitives and/or fragments associated with the first subset is processed at high resolution. A second subset of pixels is assigned to a peripheral region that is outside of the foveal region, and wherein primitives and/or fragments associated with the second subset is processed at the lower resolution (e.g., lower than the resolution associated with the foveal region).

When performing tiled rendering or deferred tile rendering, the method at 530 includes determining a first set of light sources from a plurality of light sources that affect one or more objects displayed in a first tile that is in the peripheral region. When performing tiled rendering, light sources that affect each tile in association with the image are determined. The light sources are taken from a plurality of light sources that affect a scene. This reduces processing, as light sources that do not affect objects in a tile are not considered when rendering the sub-image associated with the tile. That is, for each tile, a list of light sources affecting objects as drawn in the corresponding tile is created. As such, for a given tile (e.g., the first tile) the first set of light sources is included in the list associated with the first tile, wherein the first tile is in the peripheral region. That is, the objects displayed in the first tile are in the peripheral region, and as such, may be rendered at the lower resolution. For example, rendering at a lower resolution may include aggregating light sources as described below.

At 535, the method includes clustering at least two light sources from the first set into a first aggregated light source affecting the first tile when rendering the image in pixels of the first tile. That is, when performing foveated rendering, the objects in the first tile are determined to be in the peripheral region, and those objects may be rendered at lower resolution to include aggregating light sources. The first set of light sources has previously been determined to affect objects associated with or to be displayed in the first tile. These light sources may be aggregated into a smaller subset of light sources, such that rather than rendering the objects in the tile by considering each of the light sources in the first set on an individual basis, only the aggregated light sources are considered. Each of the aggregated light sources closely approximates the total effect produced by the first set of light sources on an individual basis. In that manner, less processing is performed to render the objects of the tile.

Figure 5B:
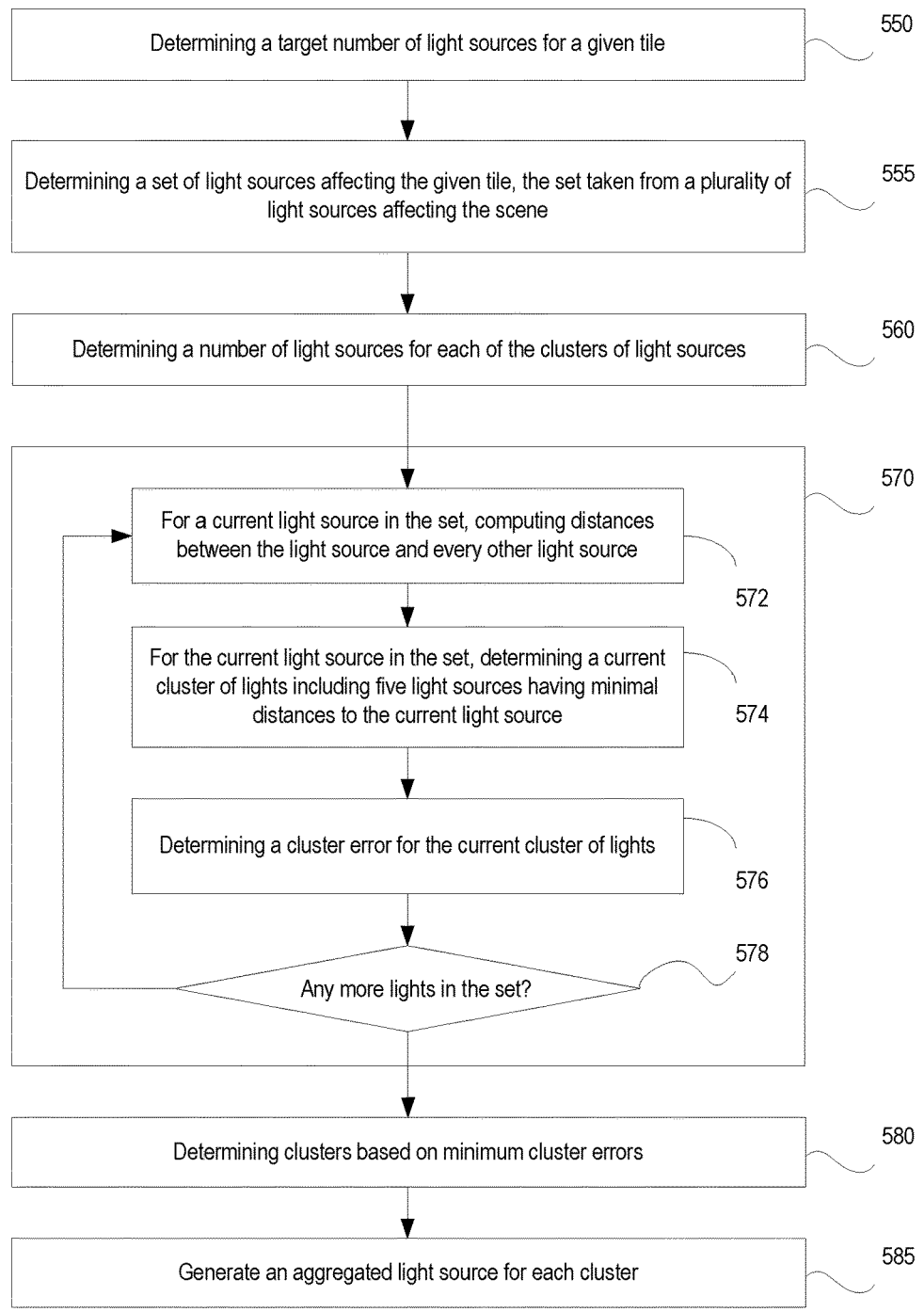
FIG. 5B is a flow diagram illustrating steps in a method for implementing a graphics pipeline configured for foveated rendering as implemented through tile deferred rendering, wherein light sources for tiles outside the foveal region are aggregated, in accordance with one embodiment of the present disclosure.

FIG. 5B is a flow diagram 500B illustrating steps in a method for implementing a graphics pipeline configured for foveated rendering as implemented through tile deferred rendering, wherein light sources for tiles outside the foveal region are aggregated, in accordance with one embodiment of the present disclosure. In particular, flow diagram 500B is performed to cluster light sources on a tile-by-tile basis, wherein an aggregated light source represents a corresponding cluster of light sources for purposes of rendering the objects of a correspond tile. Flow diagram 500B is implemented within a client device or cloud based gaming system when rendering images, as previously described. In one implementation, the client device is a gaming console (also referred to as game console).

At 550, the method includes determining a target number of light sources for a given tile. The target number corresponds to the total number of aggregated and/or non-aggregated light sources that will be processed when rendering objects associated with that tile. For instance, the maximum number of average lights of the peripheral region is specified to constrain the clustering output. That is, the method includes constraining the number of aggregated light sources affecting the first tile to the target number At 555, the method includes determining the set of light sources that affect the given tile, wherein the set is taken from a plurality of light sources that affect the scene. The target number of light sources is determined from the set of light sources that affect the tile, wherein the target number is less than or equal to the number in the set. The target number determines the maximum number of clusters of light sources for the tile when performing rendering.

At 560, the method includes determining the number of light sources in each of the clusters based on the target number and the set of light sources. In one implementation, the number of light sources in a cluster is determined by dividing the set of light sources by the target number. For example, if there are 30 light sources in the set of light sources (e.g., M=30) affecting the tile, and the target number for the tile is 5, then the number of light sources in each cluster is 6 (e.g., M/[target number of lights]=6).

Operations 570 are performed in order to cluster the M lights into a smaller number of average light sources based on the relative distance between the light sources. In embodiments, to accomplish this distance based aggregation (e.g., clustering), the clusters are generated using nearest neighbor search or a k-means clustering techniques to choose the optimal clustering of light sources, wherein each cluster of light sources is associated with a corresponding aggregated light source, and wherein each cluster of light sources includes at least one light source.

In one embodiment, a threshold is placed on the maximum distance for lights to be averaged. That is, the maximum distance between two light sources in a cluster is constrained to a maximum distance. This will prevent averaging lights that are very far apart where the new average light position may be drastically different than the original light positions.

In particular, a looped process is performed for each light source ($L\_i$) in the set of light sources (M) affecting the tile. For instance, at 572, the method includes for a current light source ($L\_i$), computing distances between the current light source ($L\_i$) and every light source (M) affecting the tile. At 574, the method includes for the current light source ($L\_i$) in the set (M), determining a current cluster of lights (Cluster_i) which includes the current light source ($L\_i$) and five other light sources having the least distances to the current light source. At 576, the method includes determining a cluster error (Cluster_error_i) for the current cluster of light sources (Cluster_i). In one implementation, the cluster error (Cluster_error_i) is determined by the sum of the distance between the current light source ($L\_i$) and each other light in the current cluster (Cluster_i). This process is performed for each light $L\_i$ in the M lights, as determined by decision step 578.

At 580, the method includes choosing clusters having the least amount of cluster error. That is, the method includes minimizing a plurality of cluster errors for the plurality of clusters of light sources. Continuing with the example where M=30 light clusters, 6 clusters are chosen having the 6 lowest cluster errors (also considering any conflicts of cluster errors). That is, for each cluster of light sources (cluster_i), a new aggregate light source is created, wherein the aggregated light source closely approximates the total effect produced from each individual light source of the cluster.

In one embodiment, to further define the cluster error, the cluster error corresponding to each cluster in the plurality of clusters of light sources includes an iterative sum of the distances between a current light source and each of the other light sources, wherein the current light source comprises a different light source in the cluster for each iteration.

In one embodiment, the aggregated light source has characteristics that are averages of the characteristics for the light sources in the cluster. For example, the aggregated light source has characteristics that are averages of distance, color, etc. The new intensity of the aggregated light source may be the sum of intensities for each light source in the cluster. Intensity may not be averages as this may lead to energy loss affecting the scene. In particular, the aggregated light source may include a new location that is the average location of the light sources in the cluster. A new color for the aggregated light source may be an average of the colors for each light source in the cluster.

In another implementation, the new color is the weighted sum of colors for each light source in the cluster. The weight for each light source ($L\_i$) is determined based on intensities of a current light source ($L\_i$) divided by the new intensity of the aggregated light source (e.g., [Intensity_$L\_i$]/[New Intensity]). As such, the new color is determined as follows: [(Intensity_$L\_i$/New Intensity)*(color_$L\_i$)]. As such, the aggregated light source has characteristics that roughly maintain the original intensity of each of the lights and will preserve the average color of the lights by weighting the color relative to the total intensity.

In one embodiment, the tile size is dynamically adjusted to fit the target number of clusters. In particular, the number of aggregated light sources affecting a given tile is constrained to the target number. When it is determined that the set of light sources affecting the tile is less than the target number, the size of the given tile is expanded to accommodate for the target number.

Figure 6A:
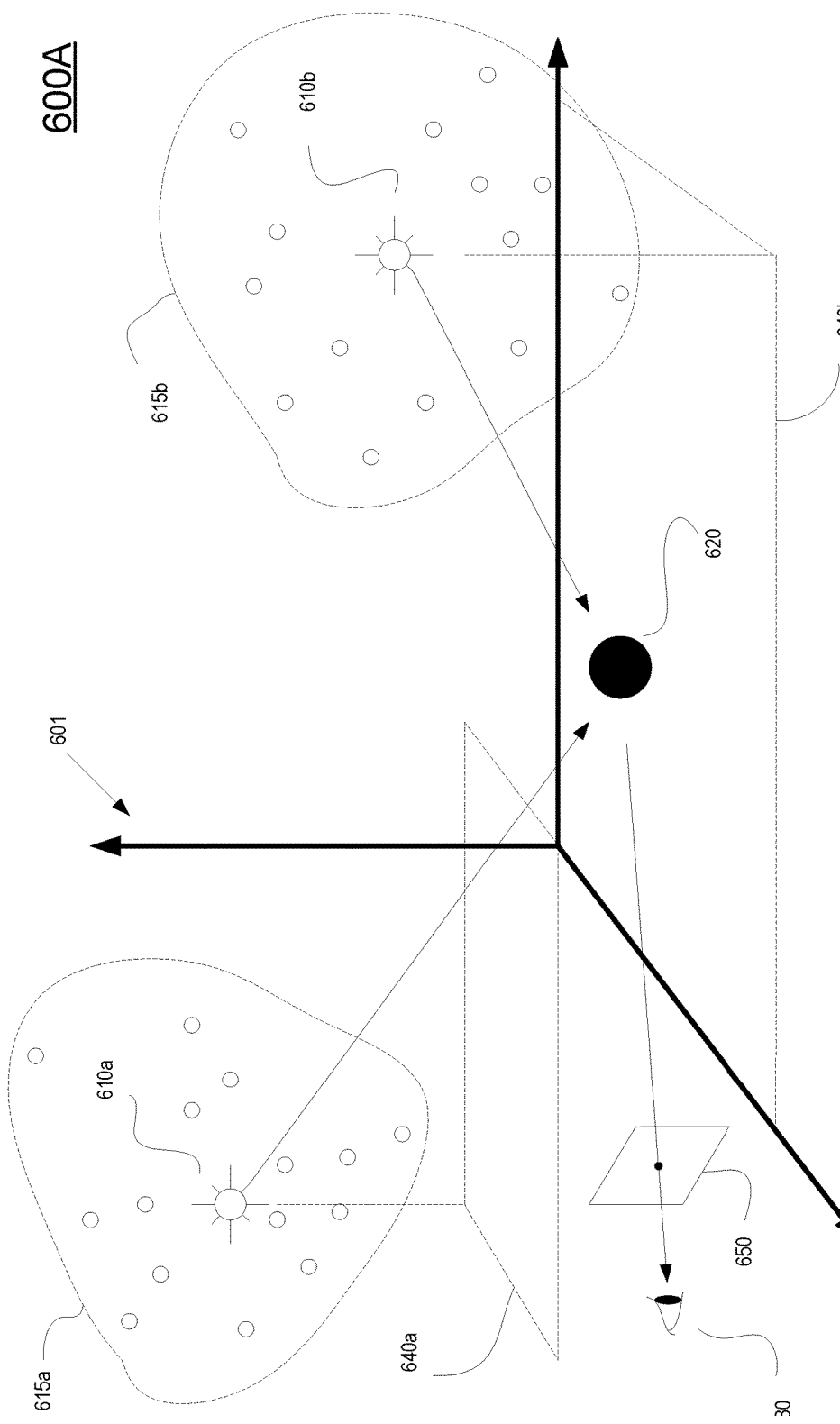
FIG. 6A is an illustration of a plurality of light sources affecting a scene and a cluster of light sources forming an aggregated light source, in accordance with one embodiment of the disclosure.

FIG. 6A is an illustration of a plurality of light sources affecting a scene 600A of a gaming world and at least one cluster of light sources forming an aggregated light source, in accordance with one embodiment of the disclosure. As shown, the gaming world 600 is defined by a coordinate system 601 in three dimensions. For purposes of simplicity and clarity one object 620 is shown in the scene 600A of the gaming world, wherein the object 620 has a location within the gaming world. The scene 600A may be rendered from the viewpoint of an eye 630 of a user, wherein the viewpoint may be rendered in an image plane corresponding to a virtual display seen by eye 630.

Two clusters of light sources are shown affecting the scene 600A. A first cluster 615a includes a plurality of light sources. Light sources in the first cluster 615a are aggregated using techniques previously described into an aggregated light source 610a. The aggregated light source 610a has characteristics that closely approximate the total effect produced from each individual light source in the cluster 615a. As shown, the aggregated light source 610a has a location in the gaming world that is defined by grid 640a contained within the coordinate system 601. In addition, a second cluster 615b includes a plurality of light sources. Light sources in the second cluster 615b are aggregated using techniques previously described into an aggregated light source 610b. The aggregated light source 610b has characteristics that closely approximate the total effect produced from each individual light source in the cluster 615b. As shown, the aggregated light source 610b has a location in the gaming world that is defined by grid 640b contained within the coordinate system 601.

Figure 6B:
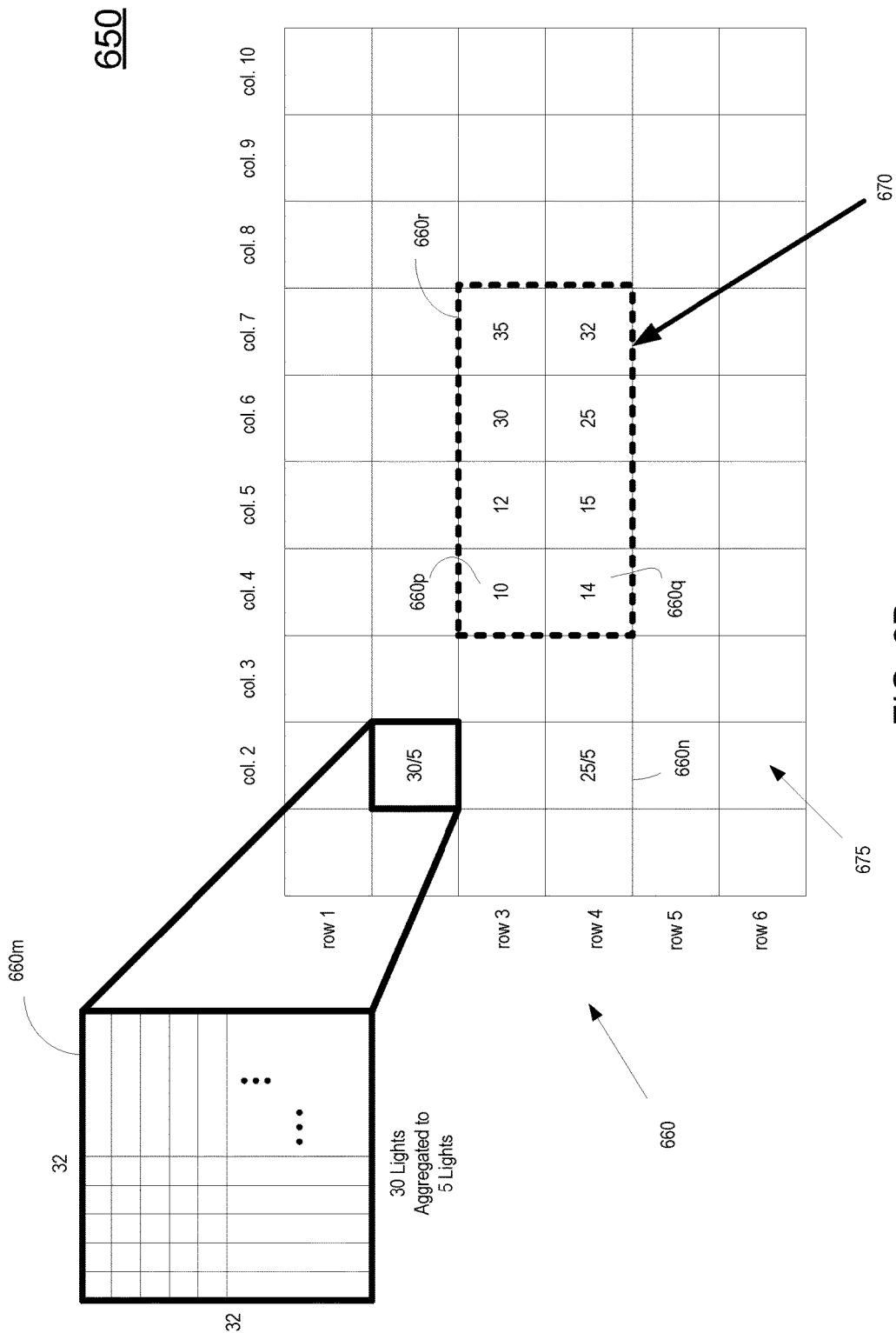
FIG. 6B is an illustration of a display partitioned into a plurality of tiles, wherein rendering is performed on a tile-by-tile basis in a deferred rendering system, in accordance with one embodiment of the present disclosure.

FIG. 6B is an illustration of a display 650 that is partitioned into a plurality of tiles 660, wherein rendering is performed on a tile-by-tile basis in a deferred rendering system of a graphics pipeline, in accordance with one embodiment of the present disclosure. In particular, the plurality of tiles in display 650 may be defined by a rectangular pattern (as identified by rows and columns of tiles). Though the tiles are rectangular in shape, any shape may be used in any arrangement (e.g., rectangular, circular, spherical etc. within 2D, 3D, or more dimensions.

As shown, display 650 includes a foveal region 670 that displays portions of an image that is rendered at higher resolution. Each of the tiles in the foveal region 670 includes a list of light sources that affect the corresponding tile. For example, the tiles in the foveal region 670 may be affected by varying numbers of light sources ranging from 10 to 35 light sources, wherein the plurality of light sources affecting the scene may be equal to or greater than 35. For instance, objects as displayed in tile 660*p* (e.g., in row 3 and col. 5) are affected by 10 light sources; objects as displayed in tile 660*q* (e.g., in row 4 and col. 5) are affected by 14 light sources; and objects as displayed in tile 660*r* (e.g., in row 3 and col. 7) are affected by 35 light sources. Because the tiles are within the foveal region 670, the light sources affecting a given tile are fully processed (e.g., individually considered through the graphics pipeline) when rendering objects (e.g., associated primitives and/or fragments) in that tile.

In addition, display 650 includes a peripheral region 675 that displays portions of an image that is rendered at a lower resolution (e.g., lower than the portions of the image rendered in the foveal region 670). Each of the tiles in the peripheral region 675 includes a list of light sources that affect corresponding tile. Further, the tiles in the peripheral region 675 are rendered at lower resolution to include using aggregated light sources for each of the tiles. For example, tile 660*n* has 25 light sources that affect objects drawn within that tile, which is grouped into 5 clusters each having its own aggregated light source. As such, tile 660*n* has 5 aggregated light sources used for rendering objects in that tile. In another example, tile 660*m* is shown with more detail. Tile 660*m* may be defined to include a grid of 32×32 pixels, for example. As previously introduced, a tile may be of various shapes and sizes. As shown, tile 660*m* has 30 light sources that affect objects drawn within that tile, which is grouped into 5 clusters each having its own aggregated light source. As such, tile 660*m* also has 5 aggregated light sources used for rendering objects in that tile.

While specific embodiments have been provided to demonstrate the implementation of a graphics processor of a video rendering system that is configured to perform foveated rendering, wherein portions of images in a foveal region are rendered with high resolution, and portions in the peripheral region are rendered with lower resolution (e.g., rendering using aggregated light sources), these are described by way of example and not by way of limitation. Those skilled in the art having read the present disclosure will realize additional embodiments falling within the spirit and scope of the present disclosure.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A Game Processing Server (GPS) (or simply a "game server") is used by game clients to play single and multiplayer video games. Most video games played over the Internet operate via a connection to the game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices to exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by a software company that owns the game title, allowing them to control and update content.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

It should be appreciated that a given video game may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

It should be understood that the embodiments described herein may be executed on any type of client device. In some embodiments, the client device is a head mounted display (HMD).

Figure 7:
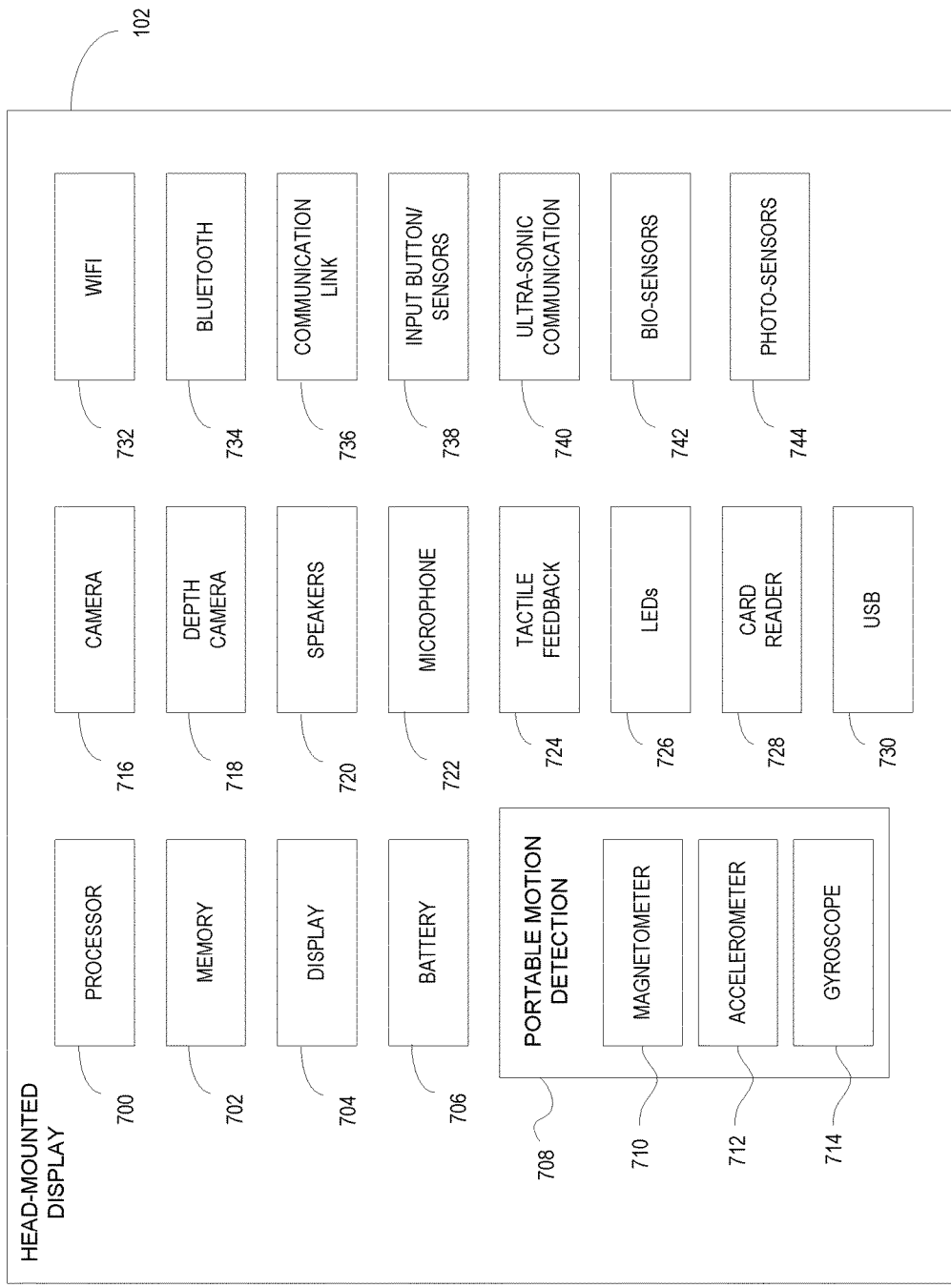
FIG. 7 is a diagram illustrating components of a head-mounted display, in accordance with an embodiment of the disclosure.

FIG. 7, a diagram illustrating components of a head-mounted display 102 is shown, in accordance with an embodiment of the disclosure. The head-mounted display 102 includes a processor 700 for executing program instructions. A memory 702 is provided for storage purposes, and may include both volatile and non-volatile memory. A display 704 is included which provides a visual interface that a user may view. A battery 706 is provided as a power source for the head-mounted display 102. A motion detection module 708 may include any of various kinds of motion sensitive hardware, such as a magnetometer 710A, an accelerometer 712, and a gyroscope 714.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 712 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 710A are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 712 is used together with magnetometer 710A to obtain the inclination and azimuth of the head-mounted display 102.

A gyroscope is a device for measuring or maintaining orientation, based on the principles of angular momentum. In one embodiment, three gyroscopes 714 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 716 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 718 may be included in the head-mounted display 102 for sensing depth information of objects in a real environment.

In one embodiment, a camera integrated on a front face of the HMD may be used to provide warnings regarding safety. For example, if the user is approaching a wall or object, the user may be warned. In one embodiment, the use may be provided with an outline view of physical objects in the room, to warn the user of their presence. The outline may, for example, be an overlay in the virtual environment. In some embodiments, the HMD user may be provided with a view to a reference marker, that is overlaid in, for example, the floor. For instance, the marker may provide the user a reference of where the center of the room is, which in which the user is playing the game. This may provide, for example, visual information to the user of where the user should move to avoid hitting a wall or other object in the room. Tactile warnings can also be provided to the user, and/or audio warnings, to provide more safety for when the user wears and plays games or navigates content with an HMD.

The head-mounted display 102 includes speakers 720 for providing audio output. Also, a microphone 722 may be included for capturing audio from the real environment, including sounds from the ambient environment, speech made by the user, etc. The head-mounted display 102 includes tactile feedback module 724 for providing tactile feedback to the user. In one embodiment, the tactile feedback module 724 is capable of causing movement and/or vibration of the head-mounted display 102 so as to provide tactile feedback to the user.

LEDs 726 are provided as visual indicators of statuses of the head-mounted display 102. For example, an LED may indicate battery level, power on, etc. A card reader 728 is provided to enable the head-mounted display 102 to read and write information to and from a memory card. A USB interface 730 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A Wi-Fi module 732 is included for enabling connection to the Internet via wireless networking technologies. Also, the head-mounted display 102 includes a Bluetooth module 734 for enabling wireless connection to other devices. A communications link 736 may also be included for connection to other devices. In one embodiment, the communications link 736 utilizes infrared transmission for wireless communication. In other embodiments, the communications link 736 may utilize any of various wireless or wired transmission protocols for communication with other devices.

Input buttons/sensors 738 are included to provide an input interface for the user. Any of various kinds of input interfaces may be included, such as buttons, touchpad, joystick, trackball, etc. An ultra-sonic communication module 740 may be included in head-mounted display 102 for facilitating communication with other devices via ultra-sonic technologies.

Bio-sensors 742 are included to enable detection of physiological data from a user. In one embodiment, the bio-sensors 742 include one or more dry electrodes for detecting bio-electric signals of the user through the user's skin.

Photo-sensors 744 are included to respond to signals from emitters (e.g., infrared base stations) placed in a 3-dimensional physical environment. The gaming console analyzes the information from the photo-sensors 744 and emitters to determine position and orientation information related to the head-mounted display 102.

The foregoing components of head-mounted display 102 have been described as merely exemplary components that may be included in head-mounted display 102. In various embodiments of the disclosure, the head-mounted display 102 may or may not include some of the various aforementioned components. Embodiments of the head-mounted display 102 may additionally include other components not presently described, but known in the art, for purposes of facilitating aspects of the present disclosure as herein described.

It will be appreciated by those skilled in the art that in various embodiments of the disclosure, the aforementioned handheld device may be utilized in conjunction with an interactive application displayed on a display to provide various interactive functions. The exemplary embodiments described herein are provided by way of example only, and not by way of limitation.

Figure 8:
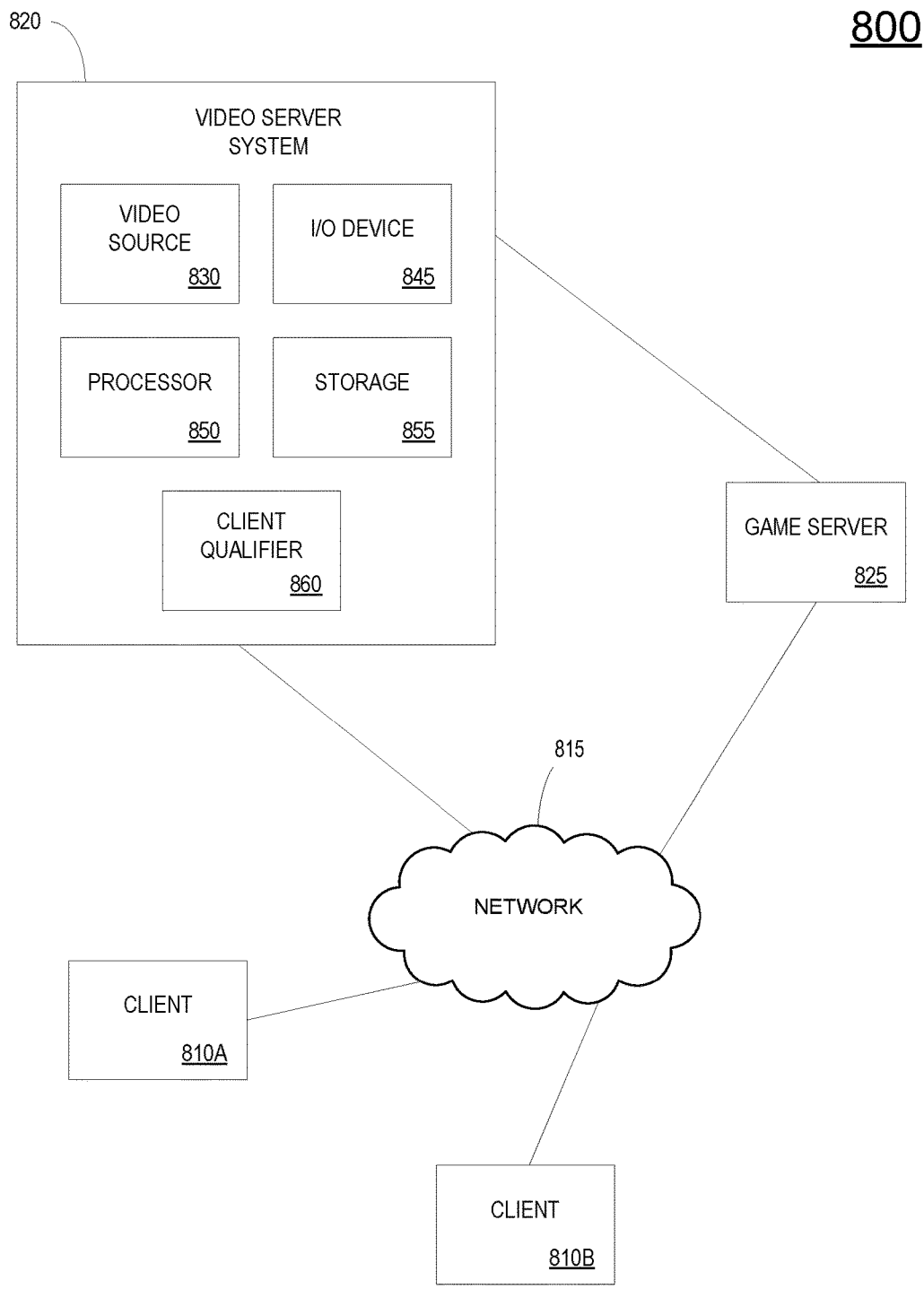
FIG. 8 is a block diagram of a Game System, according to various embodiments of the disclosure.

FIG. 8 is a block diagram of a Game System 800, according to various embodiments of the disclosure. Game System 800 is configured to provide a video stream to one or more Clients 810 via a Network 815. Game System 800 typically includes a Video Server System 820 and an optional game server 825. Video Server System 820 is configured to provide the video stream to the one or more Clients 810 with a minimal quality of service. For example, Video Server System 820 may receive a game command that changes the state of or a point of view within a video game, and provide Clients 810 with an updated video stream reflecting this change in state with minimal lag time. The Video Server System 820 may be configured to provide the video stream in a wide variety of alternative video formats, including formats yet to be defined. Further, the video stream may include video frames configured for presentation to a user at a wide variety of frame rates. Typical frame rates are 30 frames per second, 80 frames per second, and 820 frames per second. Although higher or lower frame rates are included in alternative embodiments of the disclosure.

Clients 810, referred to herein individually as 810A, 810B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 810 are configured to receive encoded video streams (i.e., compressed), decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 810 or on a separate device such as a monitor or television. Clients 810 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 810 are optionally geographically dispersed. The number of clients included in Game System 800 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 820 to deliver a game viewed through the HMD. In one embodiment, the game console receives the video stream from the video server system 820, and the game console forwards the video stream, or updates to the video stream, to the HMD for rendering.

Clients 810 are configured to receive video streams via Network 815. Network 815 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 810 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 810 may, but are not required to, further include systems configured for modifying received video. For example, a client may be configured to perform further rendering, to overlay one video image on another video image, to crop a video image, and/or the like. For example, Clients 810 may be configured to receive various types of video frames, such as I-frames, P-frames and B-frames, and to process these frames into images for display to a user. In some embodiments, a member of Clients 810 is configured to perform further rendering, shading, conversion to 3-D, or like operations on the video stream. A member of Clients 810 is optionally configured to receive more than one audio or video stream. Input devices of Clients 810 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 810 is generated and provided by Video Server System 820. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 810 are typically configured to receive inputs from a user. These inputs may include game commands configured to change the state of the video game or otherwise affect gameplay. The game commands can be received using input devices and/or may be automatically generated by computing instructions executing on Clients 810. The received game commands are communicated from Clients 810 via Network 815 to Video Server System 820 and/or Game Server 825. For example, in some embodiments, the game commands are communicated to Game Server 825 via Video Server System 820. In some embodiments, separate copies of the game commands are communicated from Clients 810 to Game Server 825 and Video Server System 820. The communication of game commands is optionally dependent on the identity of the command Game commands are optionally communicated from Client 810A through a different route or communication channel that that used to provide audio or video streams to Client 810A.

Game Server 825 is optionally operated by a different entity than Video Server System 820. For example, Game Server 825 may be operated by the publisher of a multi-player game. In this example, Video Server System 820 is optionally viewed as a client by Game Server 825 and optionally configured to appear from the point of view of Game Server 825 to be a prior art client executing a prior art game engine. Communication between Video Server System 820 and Game Server 825 optionally occurs via Network 815. As such, Game Server 825 can be a prior art multiplayer game server that sends game state information to multiple clients, one of which is game server system 820. Video Server System 820 may be configured to communicate with multiple instances of Game Server 825 at the same time. For example, Video Server System 820 can be configured to provide a plurality of different video games to different users. Each of these different video games may be supported by a different Game Server 825 and/or published by different entities. In some embodiments, several geographically distributed instances of Video Server System 820 are configured to provide game video to a plurality of different users. Each of these instances of Video Server System 820 may be in communication with the same instance of Game Server 825. Communication between Video Server System 820 and one or more Game Server 825 optionally occurs via a dedicated communication channel. For example, Video Server System 820 may be connected to Game Server 825 via a high bandwidth channel that is dedicated to communication between these two systems.

Video Server System 820 comprises at least a Video Source 830, an I/O Device 845, a Processor 850, and non-transitory Storage 855. Video Server System 820 may include one computing device or be distributed among a plurality of computing devices. These computing devices are optionally connected via a communications system such as a local area network.

Video Source 830 is configured to provide a video stream, e.g., streaming video or a series of video frames that form a moving picture. In some embodiments, Video Source 830 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects.

The game state is typically maintained based on game rules, as well as game commands such as move, turn, attack, set focus to, interact, use, and/or the like. Part of the game engine is optionally disposed within Game Server 825. Game Server 825 may maintain a copy of the state of the game based on game commands received from multiple players using geographically disperse clients. In these cases, the game state is provided by Game Server 825 to Video Source 830, wherein a copy of the game state is stored and rendering is performed. Game Server 825 may receive game commands directly from Clients 810 via Network 815, and/or may receive game commands via Video Server System 820.

Video Source 830 typically includes rendering logic, e.g., hardware, firmware, and/or software stored on a computer readable medium such as Storage 855. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 810. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 830 includes a video recording device such as a camera. This camera may be used to generate delayed or live video that can be included in the video stream of a computer game. The resulting video stream optionally includes both rendered images and images recorded using a still or video camera. Video Source 830 may also include storage devices configured to store previously recorded video to be included in a video stream. Video Source 830 may also include motion or positioning sensing devices configured to detect motion or position of an object, e.g., person, and logic configured to determine a game state or produce video-based on the detected motion and/or position.

Video Source 830 is optionally configured to provide overlays configured to be placed on other video. For example, these overlays may include a command interface, log in instructions, messages to a game player, images of other game players, video feeds of other game players (e.g., webcam video). In embodiments of Client 810A including a touch screen interface or a gaze detection interface, the overlay may include a virtual keyboard, joystick, touch pad, and/or the like. In one example of an overlay a player's voice is overlaid on an audio stream. Video Source 830 optionally further includes one or more audio sources.

In embodiments wherein Video Server System 820 is configured to maintain the game state based on input from more than one player, each player may have a different point of view comprising a position and direction of view. Video Source 830 is optionally configured to provide a separate video stream for each player based on their point of view. Further, Video Source 830 may be configured to provide a different frame size, frame data size, and/or encoding to each of Client 810. Video Source 830 is optionally configured to provide 3-D video.

I/O Device 845 is configured for Video Server System 820 to send and/or receive information such as video, commands, requests for information, a game state, gaze information, device motion, device location, user motion, client identities, player identities, game commands, security information, audio, and/or the like. I/O Device 845 typically includes communication hardware such as a network card or modem. I/O Device 845 is configured to communicate with Game Server 825, Network 815, and/or Clients 810.

Processor 850 is configured to execute logic, e.g. software, included within the various components of Video Server System 820 discussed herein. For example, Processor 850 may be programmed with software instructions in order to perform the functions of Video Source 830, Game Server 825, and/or a Client Qualifier 860. Video Server System 820 optionally includes more than one instance of Processor 850. Processor 850 may also be programmed with software instructions in order to execute commands received by Video Server System 820, or to coordinate the operation of the various elements of Game System 800 discussed herein. Processor 850 may include one or more hardware device. Processor 850 is an electronic processor.

Storage 855 includes non-transitory analog and/or digital storage devices. For example, Storage 855 may include an analog storage device configured to store video frames. Storage 855 may include a computer readable digital storage, e.g., a hard drive, an optical drive, or solid state storage. Storage 855 is configured (e.g., by way of an appropriate data structure or file system) to store video frames, artificial frames, a video stream including both video frames and artificial frames, audio frame, an audio stream, and/or the like. Storage 855 is optionally distributed among a plurality of devices. In some embodiments, Storage 855 is configured to store the software components of Video Source 830 discussed elsewhere herein. These components may be stored in a format ready to be provisioned when needed.

Video Server System 820 optionally further comprises Client Qualifier 860. Client Qualifier 860 is configured for remotely determining the capabilities of a client, such as Clients 810A or 810B. These capabilities can include both the capabilities of Client 810A itself as well as the capabilities of one or more communication channels between Client 810A and Video Server System 820. For example, Client Qualifier 860 may be configured to test a communication channel through Network 815.

Client Qualifier 860 can determine (e.g., discover) the capabilities of Client 810A manually or automatically. Manual determination includes communicating with a user of Client 810A and asking the user to provide capabilities. For example, in some embodiments, Client Qualifier 860 is configured to display images, text, and/or the like within a browser of Client 810A. In one embodiment, Client 810A is an HMD that includes a browser. In another embodiment, client 810A is a game console having a browser, which may be displayed on the HMD. The displayed objects request that the user enter information such as operating system, processor, video decoder type, type of network connection, display resolution, etc., of Client 810A. The information entered by the user is communicated back to Client Qualifier 860.

Automatic determination may occur, for example, by execution of an agent on Client 810A and/or by sending test video to Client 810A. The agent may comprise computing instructions, such as java script, embedded in a web page or installed as an add-on. The agent is optionally provided by Client Qualifier 860. In various embodiments, the agent can find out processing power of Client 810A, decoding and display capabilities of Client 810A, lag time reliability and bandwidth of communication channels between Client 810A and Video Server System 820, a display type of Client 810A, firewalls present on Client 810A, hardware of Client 810A, software executing on Client 810A, registry entries within Client 810A, and/or the like.

Client Qualifier 860 includes hardware, firmware, and/or software stored on a computer readable medium. Client Qualifier 860 is optionally disposed on a computing device separate from one or more other elements of Video Server System 820. For example, in some embodiments, Client Qualifier 860 is configured to determine the characteristics of communication channels between Clients 810 and more than one instance of Video Server System 820. In these embodiments the information discovered by Client Qualifier can be used to determine which instance of Video Server System 820 is best suited for delivery of streaming video to one of Clients 810.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the invention also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method for implementing a graphics pipeline, comprising:
   determining a plurality of light sources affecting a virtual scene, wherein each of the plurality of light sources is a virtual light source generated during execution of an application to render a plurality of images of the virtual scene in the graphics pipeline;
   projecting geometries of objects of an image of the virtual scene onto a plurality of pixels of a display from a first point-of-view;
   partitioning a plurality of pixels of the display into a plurality of tiles;
   defining a foveal region of highest resolution for the image as displayed, wherein a first subset of pixels is assigned to the foveal region, and wherein a second subset of pixels is assigned to a peripheral region that is outside of the foveal region;
   determining a first set of light sources from the plurality of light sources that affect one or more objects displayed in a first tile that is in the peripheral region; and
   clustering at least two light sources from the first set into a first aggregated light source affecting the first tile when rendering the image in pixels of the first tile.

2. The method of claim 1, further comprising:
   generating a plurality of clusters of light sources from the plurality of light sources using a nearest neighbor search or a k-means clustering technique, wherein each cluster of light sources is associated with a corresponding aggregated light source, wherein each cluster of light sources comprises at least one light source.

3. The method of claim 2, further comprising:
   constraining the number of aggregated light sources affecting the first tile to a target number;
   constraining the maximum distance between two light sources in a cluster to a maximum distance; and
   minimizing a plurality of cluster errors for the plurality of clusters of light sources; and
   for each cluster of light sources, generating a corresponding aggregated light source.

4. The method of claim 3, wherein the generating a corresponding aggregated light source further comprises:
   determining an aggregated location of the corresponding aggregated light source by averaging locations of light sources in the corresponding cluster of light sources;
   determining an aggregated intensity of the corresponding aggregated light source by summing the intensities of light sources in the corresponding cluster of light sources; and
   determining an aggregated color of the corresponding aggregated light source by performing a weighted sum of colors for light sources in the corresponding cluster of light sources.

5. The method of claim 3, wherein the cluster error corresponding to each cluster in the plurality of clusters of light sources comprises an iterative sum of the distances between a current light source and each of the other light sources, wherein the current light source comprises a different light source in the cluster for each iteration.

6. The method of claim 1, further comprising:
   constraining the number of aggregated light sources affecting the first tile to a target number;
   determining that the first set of light sources is less than the target number; and
   expanding a size of the first tile to meet the target number.

7. The method of claim 1, wherein the display comprises a head mounted display (HMD).

8. The method of claim 1, wherein the foveal region in the image corresponds to a static area that is centered in the display.

9. The method of claim 1, wherein the foveal region in the image corresponds to where on the display an eye of the user is directed.

10. A computer system comprising:
    a processor; and
    memory coupled to the processor and having stored therein instructions that, if executed by the computer system, cause the computer system to execute a method for implementing a graphics pipeline, comprising:
      determining a plurality of light sources affecting a virtual scene, wherein each of the plurality of light sources is a virtual light source generated during execution of an application to render a plurality of images of the virtual scene in the graphics pipeline;

projecting geometries of objects of an image of the virtual scene onto a plurality of pixels of a display from a first point-of-view;

partitioning a plurality of pixels of the display into a plurality of tiles;

defining a foveal region of highest resolution for the image as displayed, wherein a first subset of pixels is assigned to the foveal region, and wherein a second subset of pixels is assigned to a peripheral region that is outside of the foveal region;

determining a first set of light sources from the plurality of light sources that affect one or more objects displayed in a first tile that is in the peripheral region; and clustering at least two light sources from the first set into a first aggregated light source affecting the first tile when rendering the image in pixels of the first tile.

11. The computer system of claim 10, wherein the method further comprises:

generating a plurality of clusters of light sources from the plurality of light sources using a nearest neighbor search or a k-means clustering technique, wherein each cluster of light sources is associated with a corresponding aggregated light source, wherein each cluster of light sources comprises at least one light source.

12. The computer system of claim 11, wherein the method further comprises:

constraining the number of aggregated light sources affecting the first tile to a target number;

constraining the maximum distance between two light sources in a cluster to a maximum distance; and minimizing a plurality of cluster errors for the plurality of clusters of light sources; and for each cluster of light sources, generating a corresponding aggregated light source.

13. The computer system of claim 12, wherein the generating a corresponding aggregated light source further comprises:

determining an aggregated location of the corresponding aggregated light source by averaging locations of light sources in the corresponding cluster of light sources;

determining an aggregated intensity of the corresponding aggregated light source by summing the intensities of light sources in the corresponding cluster of light sources; and determining an aggregated color of the corresponding aggregated light source by performing a weighted sum of colors for light sources in the corresponding cluster of light sources.

14. The computer system of claim 12, wherein the cluster error corresponding to each cluster in the plurality of clusters of light sources comprises an iterative sum of the distances between a current light source and each of the other light sources, wherein the current light source comprises a different light source in the cluster for each iteration.

15. The computer system of claim 10, wherein the method further comprises:

constraining the number of aggregated light sources affecting the first tile to a target number;

determining that the first set of light sources is less than the target number; and expanding a size of the first tile to meet the target number.

16. The computer system of claim 10, wherein the display comprises a head mounted display (HMD).

17. A non-transitory computer-readable medium storing a computer program for implementing a graphics pipeline, the computer-readable medium comprising:

program instructions for determining a plurality of light sources affecting a virtual scene, wherein each of the plurality of light sources is a virtual light source generated during execution of an application to render a plurality of images of the virtual scene in the graphics pipeline;

program instructions for projecting geometries of objects of an image of the virtual scene onto a plurality of pixels of a display from a first point-of-view;

program instructions for partitioning a plurality of pixels of the display into a plurality of tiles;

program instructions for defining a foveal region of highest resolution for the image as displayed, wherein a first subset of pixels is assigned to the foveal region, and wherein a second subset of pixels is assigned to a peripheral region that is outside of the foveal region;

program instructions for determining a first set of light sources from the plurality of light sources that affect one or more objects displayed in a first tile that is in the peripheral region; and program instructions for clustering at least two light sources from the first set into a first aggregated light source affecting the first tile when rendering the image in pixels of the first tile.

18. The non-transitory computer-readable medium of claim 17, further comprising:

program instructions for generating a plurality of clusters of light sources from the plurality of light sources using a nearest neighbor search or a k-means clustering technique, wherein each cluster of light sources is associated with a corresponding aggregated light source, wherein each cluster of light sources comprises at least one light source.

19. The non-transitory computer-readable medium of claim 18, further comprising:

program instructions for constraining the number of aggregated light sources affecting the first tile to a target number;

program instructions for constraining the maximum distance between two light sources in a cluster to a maximum distance; and program instructions for minimizing a plurality of cluster errors for the plurality of clusters of light sources; and for each cluster of light sources, program instructions for generating a corresponding aggregated light source.

20. The non-transitory computer-readable medium of claim 19, wherein the program instructions for generating a corresponding aggregated light source further comprises:

program instructions for determining an aggregated location of the corresponding aggregated light source by averaging locations of light sources in the corresponding cluster of light sources;

program instructions for determining an aggregated intensity of the corresponding aggregated light source by summing the intensities of light sources in the corresponding cluster of light sources; and program instructions for determining an aggregated color of the corresponding aggregated light source by performing a weighted sum of colors for light sources in the corresponding cluster of light sources.

21. The non-transitory computer-readable medium of claim 19, wherein the cluster error corresponding to each cluster in the plurality of clusters of light sources comprises an iterative sum of the distances between a current light source and each of the other light sources, wherein the current light source comprises a different light source in the cluster for each iteration.

\* \* \* \* \*